(12) United States Patent
Kim et al.

(10) Patent No.: US 10,051,631 B2
(45) Date of Patent: Aug. 14, 2018

(54) APPARATUS AND METHOD FOR DETECTING SIGNALS BASED ON PARTIAL CANDIDATE IN WIRELESS COMMUNICATION SYSTEM

(71) Applicants: Samsung Electronics Co., Ltd, Gyeonggi-do (KR); Industry-Academic Cooperation Foundation, Yonsei University, Seoul (KR)

(72) Inventors: Kyeongyeon Kim, Gyeonggi-do (KR); Dongkyu Sim, Seoul (KR); Chungyong Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/354,945

(22) Filed: Nov. 17, 2016

(65) Prior Publication Data
US 2017/0142726 A1 May 18, 2017

(30) Foreign Application Priority Data
Nov. 17, 2015 (KR) .................... 10-2015-0161327

(51) Int. Cl.
*H04W 4/00* (2018.01)
*H04L 27/06* (2006.01)
*H04W 72/04* (2009.01)
*H04B 7/06* (2006.01)

(52) U.S. Cl.
CPC ...... *H04W 72/0453* (2013.01); *H04B 7/0632* (2013.01)

(58) Field of Classification Search
CPC .................... H04B 7/0632; H04W 72/0453
USPC ........................................... 455/450
See application file for complete search history.

(56) References Cited

U.S. PATENT DOCUMENTS

| | | | | |
|---|---|---|---|---|
| 5,351,274 | A * | 9/1994 | Chennakeshu | H04B 7/082 375/341 |
| 8,347,434 | B2 * | 1/2013 | Chan | A47G 9/1027 5/636 |
| 8,693,561 | B2 | 4/2014 | Raju et al. | |
| 8,767,657 | B1 * | 7/2014 | Dehghan | H04L 27/2647 370/329 |
| 8,995,584 | B1 * | 3/2015 | Choi | H04B 7/0413 375/341 |
| 2006/0148506 | A1 * | 7/2006 | Hoo | H04B 7/0413 455/522 |
| 2007/0054621 | A1 * | 3/2007 | Larsson | H04B 7/022 455/67.11 |

(Continued)

*Primary Examiner* — Nathan Taylor

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). An operation method of an apparatus may include generating an initial detection result based on signals received through a plurality of carriers from a transmission device; determining a first detection area in the initial detection result based on a channel gain; generating a plurality of first symbol groups by inserting available symbols into the first detection area of the initial detection result; and generating a first detection result based on a first symbol group with the maximum likelihood among the plurality of first symbol groups.

20 Claims, 27 Drawing Sheets

(56) References Cited

U.S. PATENT DOCUMENTS

| | | | |
|---|---|---|---|
| 2008/0056396 A1* | 3/2008 | Li | H04L 25/0242 375/260 |
| 2008/0267306 A1* | 10/2008 | Batra | H04L 25/03171 375/262 |
| 2009/0201849 A1* | 8/2009 | Sawahashi | H04B 7/0669 370/328 |
| 2010/0150274 A1* | 6/2010 | Dai | H04B 7/0413 375/340 |
| 2011/0007851 A1* | 1/2011 | Li | H04L 25/03203 375/340 |
| 2011/0058617 A1* | 3/2011 | Rekaya-Ben Othman | H04L 1/0036 375/260 |
| 2011/0064168 A1* | 3/2011 | Cheun | H04L 1/0631 375/340 |
| 2011/0069746 A1* | 3/2011 | Chockalingam | H04B 7/0669 375/224 |
| 2011/0080979 A1* | 4/2011 | Duggan | H04L 1/0045 375/340 |
| 2012/0263080 A1* | 10/2012 | Cho | H04B 7/0434 370/310 |
| 2013/0243062 A1* | 9/2013 | Raju | H04L 25/0204 375/226 |
| 2014/0072022 A1* | 3/2014 | Medles | H04B 17/391 375/227 |
| 2014/0086296 A1* | 3/2014 | Badic | H04L 25/03891 375/229 |
| 2015/0078490 A1* | 3/2015 | Hu | H04L 1/0054 375/341 |
| 2015/0188667 A1* | 7/2015 | Tong | H04L 1/0048 375/341 |
| 2015/0295737 A1* | 10/2015 | Kim | H04L 25/03318 375/267 |
| 2015/0341143 A1* | 11/2015 | Wan | H04L 1/0054 375/341 |
| 2016/0365949 A1* | 12/2016 | Tseng | H04L 1/0054 |

* cited by examiner

APPARATUS AND METHOD FOR DETECTING SIGNALS BASED ON PARTIAL CANDIDATE IN WIRELESS COMMUNICATION SYSTEM

CROSS-REFERENCE TO RELATED APPLICATION(S) AND CLAIM OF PRIORITY

The present application is related to and claims priority under 35 U.S.C. § 119(a) to Korean Application Serial No. 10-2015-0161327, which was filed in the Korean Intellectual Property Office on Nov. 17, 2015, the entire content of which is hereby incorporated by reference.

TECHNICAL FIELD

The present disclosure relates to technologies for detecting a signal in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Recently, for simultaneous transmission and reception of data based on the development of the wireless communication technology field, a multi-input multi-Output (MIMO) communication system (hereinafter, referred to as a "MIMO system") has received attention. The MIMO system increases a capacity of the wireless communication system through the use of a plurality of antennas and may simultaneously transmit and receive data, which are divided into a plurality of pieces of sub-data, without demanding noticeable additional spectrums or power.

A reception device uses a maximum likelihood detection (ML detection) to increase reception capability. However, in multi-carrier and MIMO systems, applying the conventional ML detection has a problem of high complexity in a calculation process. A large amount of research on a method for reducing complexity while meeting the capability of the conventional ML receiver has been made. However, when the method is applied to the multi-carrier environment and the MIMO system to reduce the complexity, inter-carrier interference and inter-symbol interference cannot be efficiently considered.

SUMMARY

To address the above-discussed deficiencies, it is a primary object to provide an apparatus and a method for detecting an optimal signal by detecting partial candidate-based maximum likelihood.

An operation method of an apparatus according to various embodiments includes: generating an initial detection result based on signals received through a plurality of carriers from a transmission device; determining a first detection area in the initial detection result based on a channel gain; generating a plurality of first symbol groups by inserting available symbols into the first detection area of the initial detection result; and generating a first detection result based on a first symbol group having the maximum likelihood among the plurality of first symbol groups.

An apparatus according to various embodiments may include a controller. For example, the controller may be configured to generate an initial detection result based on signals received through a plurality of carriers from a transmission device, to determine a first detection area in the initial detection result based on a channel gain, to generate a plurality of first symbol groups by inserting available symbols into the first detection area of the initial detection result, and to generate a first detection result based on a first symbol group having the maximum likelihood among the plurality of first symbol groups.

An apparatus and a method according to various embodiments can have the same performance as that of the convention scheme while reducing complexity in the conventional maximum likelihood detection scheme by performing partial candidate-based maximum likelihood detection.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts: For a more complete understanding of the present disclosure, the following detailed description will be made with reference to the accompanying drawings. In the drawings, the same reference numerals indicate the same elements.

DETAILED DESCRIPTION

Figure 1:
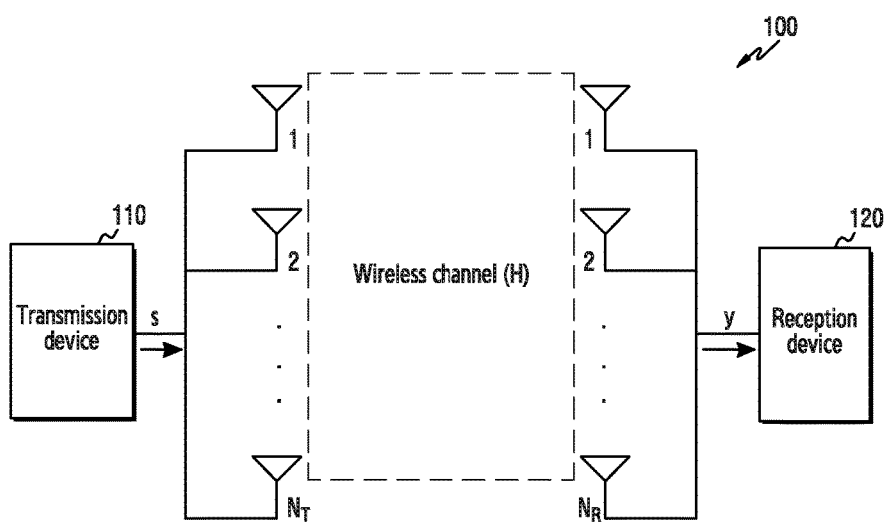
FIG. 1 illustrates a transmission device and a reception device in a wireless communication system according to various embodiments of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, the operational principle of the present disclosure will be described in detail with reference to the accompanying drawings. In describing various embodiments below, a detailed description of related known configurations or functions incorporated herein will be omitted when it is determined that the detailed description thereof may unnecessarily obscure the subject matter of the present disclosure. Terms described below are defined in consideration of functions in various embodiments, but may vary according to the intention or convention of a user or operator. Therefore, the definitions of the terms should be made based on the contents throughout the specification.

Hereinafter, the present disclosure describes a scheme for detecting maximum likelihood in a multi-carrier and MIMO system.

The terms (for example, a signal or a symbol) referring to information used in the following description, the terms (for example, a detection result) referring to a result, and the terms (for example, a receiver or a controller) referring to an element of a reception device are used for convenience of the description. Accordingly, the present disclosure is not limited to the following terms and other terms having the same technical meaning may be used.

Multi-carrier systems generate inter-carrier interference (ICI) and inter-symbol interference (ISI) due to various reasons. In orthogonal frequency division multiplexing (OFDM), ICI occurs due to problems of a time-invariant environment or an oscillator of a receiver. In filter bank multi carrier (FBMC), both ICI and ISI occur due to damage to orthogonality of a filter in a delay spread environment. The interference makes applying Maximum Likelihood detection (ML detection) to the multi-carrier system difficult. The conventionally proposed ML detection schemes excessively increase complexity due to consideration of all the available symbol groups, and thus cannot be actually implemented. Further, when the detection is performed only in a large channel gain area, an influence of interference cannot be considered in an area including other carriers.

The conventional per-tone ML detection generates an error since a uniform size of a signal to interference ratio cannot be guaranteed. When the ML detection is performed in the whole multi-carrier system in order to prevent such an error, an amount of calculation increases and thus actual application is impossible.

In the multi-carrier system, interference is concentrated in a particular part unlike the general MIMO system. Accordingly, when predetermined processing is performed on the concentrated part, an effect of interference may be minimized. Temporary symbols $S_{temp}$ are detected using a per-tone liner receiver having low complexity. Under an assumption that there is no interference for each subcarrier, a received signal may be measured as an approximation. Thereafter, with respect to the measured signal, symbols for each carrier may be detected using a carrier equalizer (EQ). The temporary symbol $S_{temp}$ may be arranged through the application of an order algorithm. The symbols may be arranged in a frequency domain based on an antenna having a larger average channel gain of transmission antennas. The symbols may be arranged in a time domain to first detect a sub-symbol receiving the smallest influence of delay spread in an FBMC system. In an FBMC environment, an effective channel of a sub-symbol of each FBMC including a CFO and time-variant dependency of a current channel may be estimated. An SINR of the effective channel of the FBMC sub-symbol may be measured and used as an index of the generated delay spread.

The temporary symbols $S_{temp}$ are classified into a plurality of candidate groups. The size of the candidate group may be actively set according to characteristics of a channel, a filter, and a modulation scheme. After an SIR value is measured based on a current channel state and filter characteristics, the number of subcarriers to be used for ML detection may be controlled based on the SIR value. The size of the candidate group may be controlled within a particular carrier according to a modulation order. The ML detection is sequentially performed on the plurality of candidates based on the arrangement. New symbols $S_1$ may be detected.

The temporary symbols $S_{temp}$ and the new symbols $S_1$ are compared. Based on the comparison between all the symbols, a different part may be set as a redetection subcarrier area. Further, based on comparison between a distance between the temporary symbol $S_{temp}$ and the received signal and a distance between the new symbol $S_1$ and the received signal, a part having a longer distance between the new symbol $S_1$ and the received signal may be set as the redetection subcarrier area. When the particular carrier does not guarantee an average SIR value required for performing the ML detection, the particular carrier may be set as the redetection subcarrier area. The ML detection is performed on the redetection subcarrier area. Symbols which are closer to the actual signal compared to the new symbols $S_1$ may be detected.

According to various embodiments of the present disclosure, a bit rrror rate (BER) close to a BER of optimum ML detection in an environment where a Carrier frequency Offset (CFO) exists may be obtained in the OFDM environment. In a predetermined parameter, performance improvement of about 2.7 decibel (dB) may be made compared to the ML detection in the FBMC based on BER $10^{-2}$.

According to various embodiments of the present disclosure, in the FBMC environment, a larger gain is obtained compared to ML detection with interference cancellation. The BER performance lower than that in the OFDM environment may be improved through optimization of an alignment algorithm and a comparison of a distance from the received signal.

An apparatus according to various embodiments of the present disclosure has an advantage in performing ML detection in a multi-carrier system without an interference cancellation process and an advantage in obtaining a desired BER performance while maintaining low complexity. Further, there is an advantage in significantly reducing complexity compared to "banded ML" in which the ML detection is performed with adjacent subcarriers to consider interference. In addition, a transmission antenna-specific average channel gain on the frequency domain may show characteristics of all antenna areas relatively well. The arrangement of antennas in the ML detection process is impossible. However, various embodiments of the present disclosure have an advantage in substituting a one dimensional problem for a two dimensional problem by arranging the antennas according to channel gains in the antennas of the transmission device.

FIG. 1 illustrates a transmission device and a reception device in a wireless communication system.

Referring to FIG. 1, a MIMO system may include $N_t$ antennas in a transmission device 110 and $N_r$ antennas in a reception antenna 120. The transmission device 110 transmits a signal s and the reception device 120 receives a signal y. Equation (1) below may be made in consideration of noise generated in actual transmission.

$$\begin{bmatrix} [y]^1 \\ [y]^2 \\ \vdots \\ [y]^{N_R} \end{bmatrix} = \begin{bmatrix} [H]^{11} & [H]^{12} & \dots & [H]^{1N_T} \\ [H]^{21} & [H]^{22} & \dots & [H]^{2N_T} \\ \vdots & \vdots & \ddots & \vdots \\ [H]^{N_R 1} & [H]^{N_R 2} & \dots & [H]^{N_R N_T} \end{bmatrix} \begin{bmatrix} [s]^1 \\ [s]^2 \\ \vdots \\ [s]^{N_T} \end{bmatrix} + \begin{bmatrix} [n]^1 \\ [n]^2 \\ \vdots \\ [n]^{N_R} \end{bmatrix} \quad (1)$$

In equation (1), s denotes a signal transmitted by the transmission device 110, y denotes a signal received by the reception device 120, and n denotes noise generated in actual transmission. [Hxy] denotes a channel between an $x^{th}$ antenna of the reception device 120 and a $y^{th}$ antenna of the transmission device 110. $N_t$ denotes the number of antennas of the transmission device 110 and $N_r$ denotes the number of antennas of the reception device 120.

Figure 2:
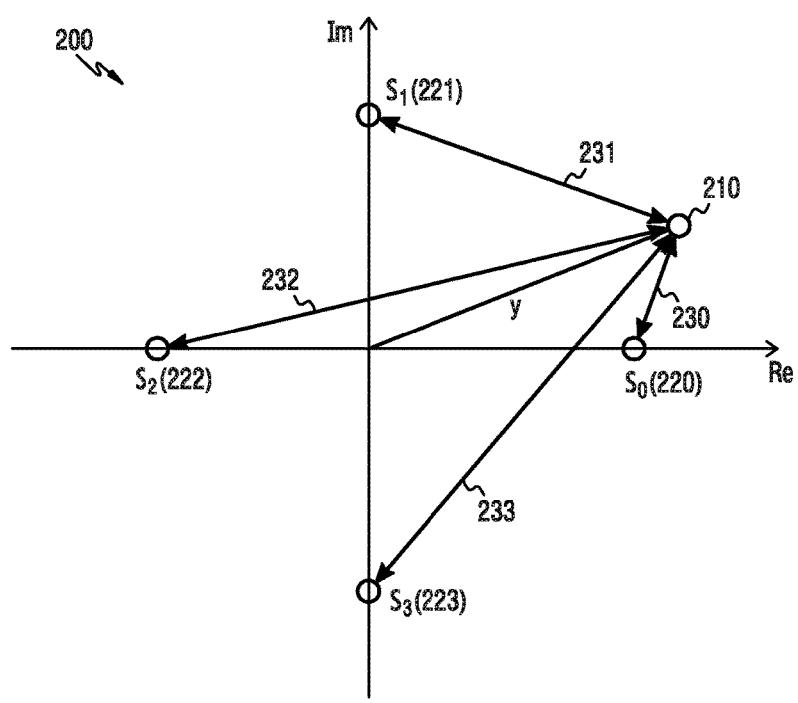
FIG. 2 illustrates a constellation of general maximum likelihood (ML) detection according to various embodiments of the present disclosure.

FIG. 2 illustrates a constellation of general ML detection.

Referring to FIG. 2, a constellation 200 corresponds to a constellation according to a modulation scheme 4 quadrature amplitude modulation (QAM). The constellation 200 may include a reception vector 210. The vector 210 may correspond to a part of the signal y received by the reception device 120. The constellation 200 may include constellation points 220, 221, 222, and 223. The reception vector 210 may correspond to one of the four constellation points. The reception device measures a distance between the reception vector 210 and each of the constellation points 220, 221, 222, and 223. The distances may correspond to reference numerals 230, 231, 232, and 233, respectively. The constellation points 220, 221, 222, and 223 correspond to S0, S1, S2, and S3, respectively. The distance may be a Euclidean distance.

As the distance is shorter, it is highly likely to be closer to a symbol value of the actual signal. In the constellation 200, the reception device may determine the distance 230 which is the smallest value among the measured distances.

The reception device may determine the constellation point 220 correspond to the distance 230. $S_0$ corresponding to the determined constellation point may be determined as a value corresponding to the part of the signal y. The detection may be expressed by equation (2) below.

$$s = \arg\min_{s \in s_0 \ldots s_3} \|y_k - Hs\| \tag{2}$$

$y_k$ denotes a value corresponding to the part of the signal y, H denotes a channel matrix, s denotes a symbol parameter, and S0, S1, S2, and S3 denote available symbols. In order to determine the symbol in the transmission device, which is $y_k$ corresponding to a part of the received signal y, available symbol values $s_0$, $s_1$, $s_2$, $s_3$ may be substituted in all symbol parameters s of equation (2). As shown in equation (2) above, a symbol value having the shortest Euclidean distance may be determined as $y_k$.

Figure 3A:
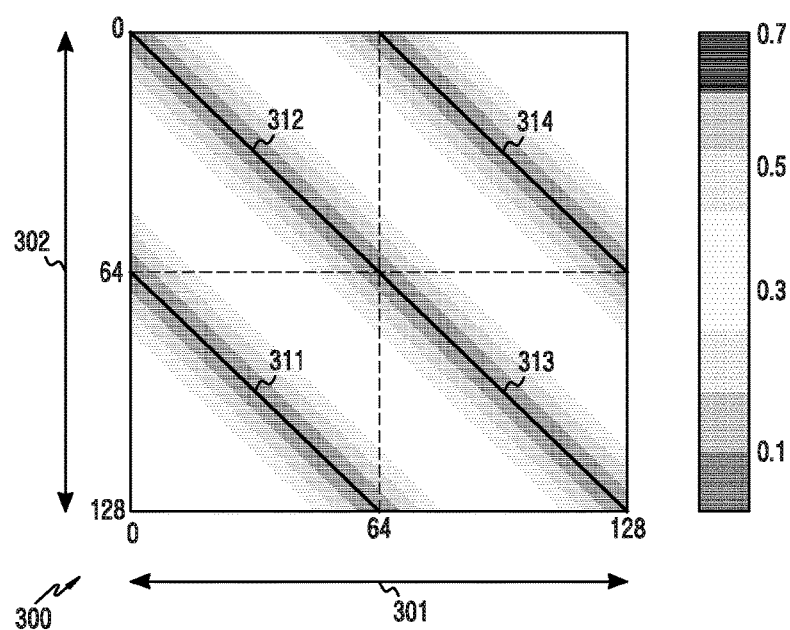
FIG. 3A illustrates a strength of an effective channel signal in a multiple-nput multiple output orthogonal frequency division multiplexing (MIMO-OFDM) system according to various embodiments of the present disclosure.

FIG. 3A illustrates a strength of an effective channel signal in a multiple input multiple output orthogonal frequency division multiplexing (MIMO-OFDM) system.

Referring to FIG. 3A, a horizontal axis 301 of a graph 300 indicates a subcarrier index of the transmission device, and a vertical axis 302 of the graph 300 indicates a subcarrier index of the reception device. One subcarrier index may be specified by a combination of a pair of one physical subcarrier and one antenna. That is, a maximum value of the subcarrier index may be determined according to the number of antennas and the number of subcarriers. As illustrated in FIG. 3A, the horizontal axis 301 may have 128 indexes and the vertical axis 302 may have 128 indexes. The number of antennas of the transmission device may be 2, the number of antennas of the reception device may be 2, and the number of subcarriers may be 64 and, accordingly, a receiving side and a transmitting side may have a total of 128 effective subcarriers. An effective channel between a first antenna of the transmission device and a first antenna of the reception device may be a second quadrant 312, an effective channel between the first antenna of the transmission device and a second antenna of the reception device may be a first quadrant 314, an effective channel between a second antenna of the transmission device and the first antenna of the reception device may be a third quadrant 311, and an effective channel between the second antenna of the transmission device and a second antenna of the reception device may be a fourth quadrant 311. A darker color means a stronger signal and a lighter color means a weaker signal.

Referring to the graph 300, a gain between different carriers which are not adjacent to each other may be close to zero (0). However, it is noted that antennas of the transmission device and the reception device have the highest gain in the same carrier.

Figure 3B:
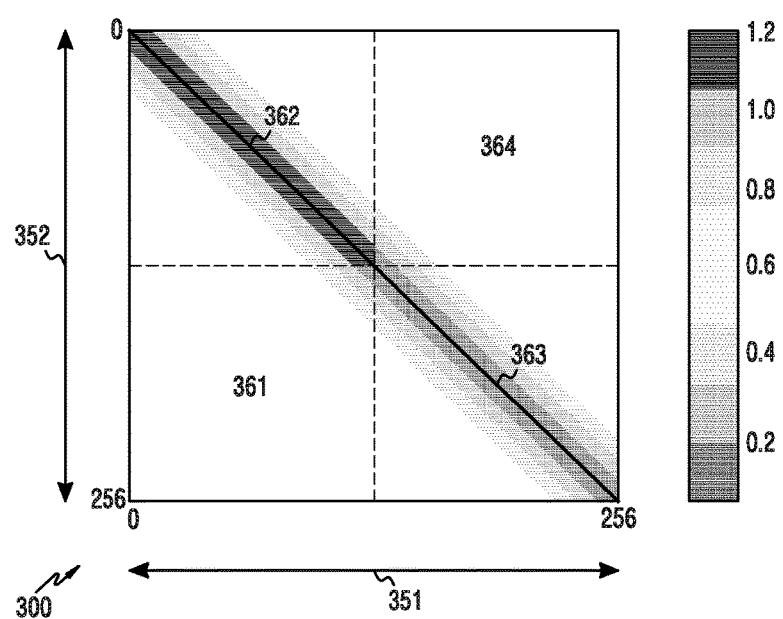
FIG. 3B illustrates a strength of an effective channel signal in a single input single output filter bank multi carrier (SISO-FBMC) system according to various embodiments of the present disclosure.

FIG. 3B illustrates a strength of an effective channel signal in a single input single output filter bank multi carrier (SISO-FBMC) system.

Referring to FIG. 3B, the system may be a dual filter bank FBMC. The dual filter bank FBMC may have four FBMC sub-symbols. A horizontal axis 351 of a graph 350 indicates indexes of subcarriers of the transmission device and a vertical axis 352 of the graphs 350 indicates indexes of subcarriers of the reception device. As illustrated in FIG. 3B, the horizontal axis 351 may have 64 indexes and the vertical axis 352 may have 64 indexes.

A square of the graph 350 may have a size of 256×256. When the square of the graph 350 is divided into quarters, four squares having a size of 128×128 may be generated. The four squares may correspond to the four FBMC sub-symbols. Each of the four squares may indicate an effective channel between filters. The four squares may have 32 horizontal axis subcarriers and 32 vertical axis subcarriers. Each of the four squares may have a size of 128×128. Since a first quadrant 364 and a third quadrant 361 are effective channels between different filters, there is little gain. However, since a second quadrant 362 and a fourth quadrant 363 are effective channels between the same filters, it is noted that the highest gain exists in a diagonal direction part. In the fourth quadrant 363, filter characteristics are not good, so that an influence of interference from FBMC sub-symbols corresponding to the filter characteristics may be larger.

As illustrated in FIGS. 3A and 3B, when an effective channel is received in the multi-carrier system, signals may be concentrated in a predetermined area. When signal strength is strong, an influence on neighboring carriers is large and, accordingly, an influence of interference may be strong. According to various embodiments, when a signal is detected after predetermining processing is performed on the received signal in consideration of the concentrated part, the influence of the interference may be more efficiently removed. The interference may be inter-carrier interference or inter-symbol interference.

Figure 4:
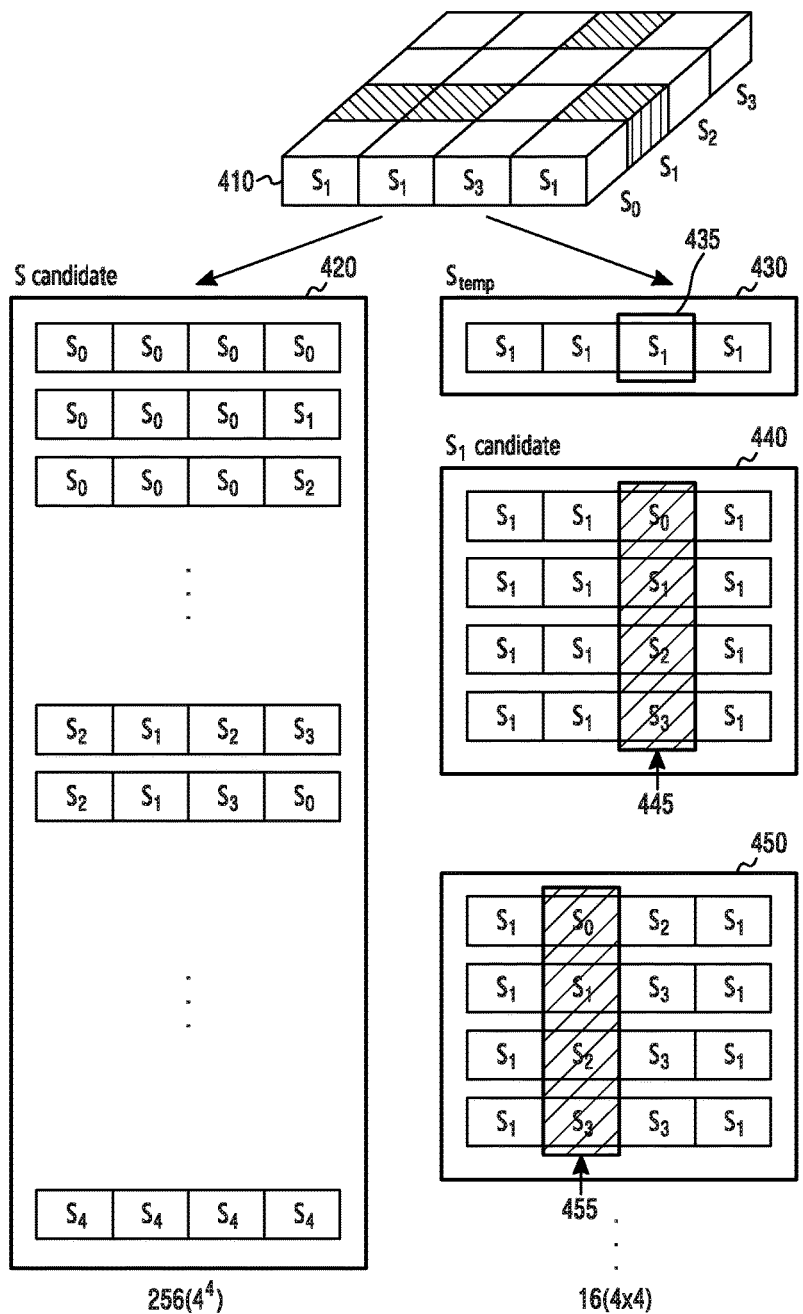
FIG. 4 illustrates a plurality of symbol groups considering multiple carriers in a wireless communication system according to various embodiments of the present disclosure.

FIG. 4 illustrates a plurality of symbol groups considering multiple carriers in a wireless communication system.

Referring to FIG. 4, a symbol group 410 may be a signal s transmitted by the transmission device 110. Respective symbols may correspond to different carriers. Based on the 4 QAM modulation scheme, one carrier may correspond to four symbols s0, s1, s2, and s3. When ML detection is performed, 256 (44) symbol groups may be generated since the four symbols and four carriers exist. The 256 symbol groups may be a plurality of symbol groups 420.

According to various embodiments of the present disclosure, an initial detection result 430 of the signal s transmitted by the transmission device 110 may be generated. A detection area 435 may be determined from the initial detection result 430 based on a channel gain. A plurality of symbol groups 440 may be generated by inserting available symbols into the detection area 435 of the initial detection result 430. The detection area 435 may correspond to a detection area 445. Based on the 4 QAM modulation scheme, four symbols may correspond to the detection area 445. Symbols of another area may be fixed to previously detected values when the ML detection is performed. When the detection of the detection area 445 ends, the ML detection is performed on the other areas. The other areas may include a detection area 455. As illustrated in FIG. 4, the detection area may be configured in the unit of carriers. The plurality of symbol groups 440 may have four symbol groups. When the ML detection is performed on all the symbol groups, all the plurality of symbol groups may have 16 (4×4) symbol groups because a total of four carriers are used. In a case of the plurality of symbol groups 440, symbols groups may be generated based on the initial detection result 430. Accordingly, an influence of interference of the actual signal may be considered. Further, the smaller number of symbol groups may be used as candidates. Accordingly, complexity may be reduced compared to the plurality of symbol groups 420.

Figure 5:
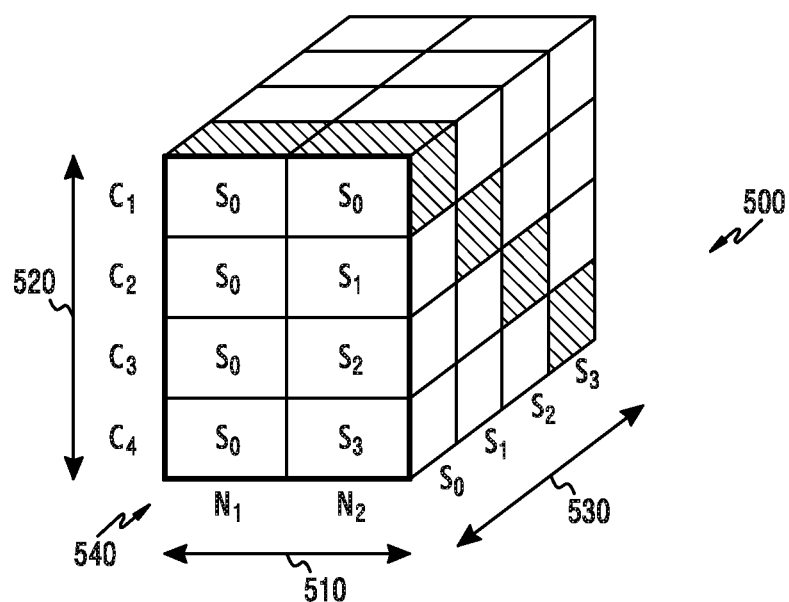
FIG. 5 illustrates a symbol group considering multiple carriers and a plurality of antennas in a wireless communication system according to various embodiments of the present disclosure.

FIG. 5 illustrates a symbol group considering multiple carriers and a plurality of antennas in a wireless communication system.

Referring to FIG. 5, an axis 510 may indicate antennas of the transmission device, an axis 520 may indicate carriers, and an axis 530 may indicate symbols that a signal may have. A quadrangle 540 may indicate a size of one symbol group among available symbol groups in ML detection. The number of symbols may be determined according to a modulation scheme.

As illustrated in FIG. 5, the number of antennas of the transmission device is 2 ($N_1$, $N_2$), the number of carriers is 4 ($c_1$, $c_2$, $c_3$, $c_4$), and the signal follows a modulation scheme of 4 QAM, so that the signal may have one of four symbols. A size of one symbol among the available symbol groups in ML detection is 8 (2×4). When the ML detection is performed on all, a size of one symbol group is 8 and a total number of available symbol groups is $4^8$. The ML detection may have complexity of $4^8$. When the apparatus is implemented, if complexity is high, a realistic implementation may be difficult. Accordingly, a scheme for reducing complexity in the ML detection is needed.

In the following description, it is assumed that the MIMO system includes a transmitting side having two transmission antennas and a receiving side having two reception antennas. It is assumed that the number of carriers is 4 and the modulation scheme is 4 QAM unless there is other description. The above description may be equally applied to a case where the transmitting side and the receiving side include a plurality of antennas.

Figure 6:
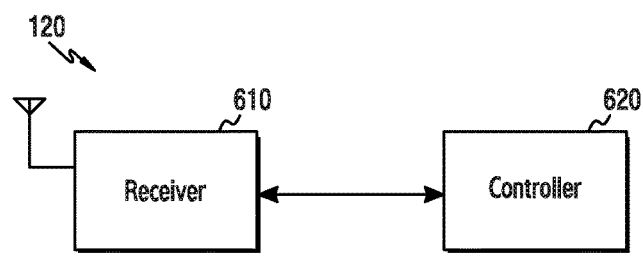
FIG. 6 illustrates a reception device according to various embodiments of the present disclosure.

FIG. 6 illustrates a reception device according to an embodiment. The reception device may be the reception device 120 illustrated in FIG. 1.

Referring to FIG. 6, the reception device 120 may include a receiver 610 and a controller 620. The receiver 610 may receive a signal. That is, the receiver 610 performs functions for transmitting and receiving a signal through a wireless channel. For example, the receiver 610 performs a conversion function between a radio frequency (RF) signal and a baseband signal according to a physical layer standard of a system. For example, when data is received, the receiver 610 receives an RF signal through at least one antenna, processes the RF signal, down-converts the RF signal into a baseband signal, and converts the baseband signal into a digital signal. For example, the receiver 610 may include a reception filter, an amplifier, a mixer, an oscillator, a digital to analog convertor (DAC), an analog to digital convertor (ADC), and the like. When a plurality of reception antennas are provided, the receiver 610 may include a plurality of RF chains. The receiver 610 may be referred to as an "RF processor" and a "transceiver".

The controller 620 processes the signal received through the receiver 610. For example, the controller 620 may perform detection on signals received through a plurality of subcarriers from the transmission device. The controller 620 may be referred to as a "baseband processor".

For example, the controller 620 may be configured to generate an initial detection result based on the signals received through the plurality of carriers from the transmission device, configured to determine a first detection area from the initial detection result based on a channel gain, configured to generate a plurality of first symbol groups by inserting available symbols into the first detection area of the initial detection result, and configured to generate a first detection result based on a first symbol group having the maximum likelihood among the plurality of first symbol groups.

According to various embodiments, the controller may be configured to determine a second detection area different from the first detection area in the initial detection result, to generate a plurality of second symbol groups by inserting available symbols into the second detection area of the first detection result, and to generate a second detection result based on a second symbol group having the maximum likelihood among the plurality of second symbol groups.

According to various embodiments, the controller may be configured to determine a third detection area based on the initial detection result and the second detection result, to generate a plurality of third symbol groups by inserting available symbols into the third detection area of the second detection result, and to generate a third detection result based on a third symbol group having the maximum likelihood among the plurality of third symbol groups. The third detection area may be a detection area that does not correspond to the second detection result in the initial detection result.

According to various embodiments, the first detection area may correspond to at least one carrier of the plurality of carriers.

According to various embodiments, the at least one carrier may be determined according to a size of a channel gain of an antenna included in the transmission device.

According to various embodiments, the at least one carrier may be determined according to a signal-to-interference ratio (SIR) value of the received signal, and the SIR value may be a value measured based on at least one of a channel state between the transmission device and the reception deice and filter characteristics.

According to various embodiments, the first detection area may be determined based on at least one of a degree of delay spread of the signal and a modulation order of the signal.

Figure 7:
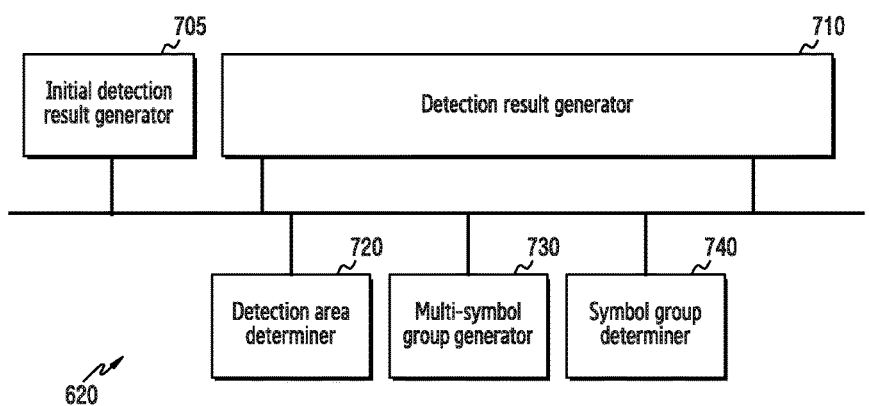
FIG. 7 illustrates a controller of a reception device according to various embodiments of the present disclosure.

FIG. 7 illustrates a controller of a reception device according to an embodiment. The controller may be the controller 620 illustrated in FIG. 6.

Referring to FIG. 7, the controller 620 may include an initial detection result generator 705, a detection result generator 710, a detection area determiner 720, a multi-symbol group generator 730, and a symbol group determiner 740.

The initial detection result generator 705 may have the signal received from the receiver included in the reception device as an input. In response to the input, the initial detection result generator 705 may generate the initial detection result in the form of a symbol group. The initial detection result may be used as an output.

The detection result generator 710 may generate a symbol group. The symbol group may be one of the first detection result generated by the controller of FIG. 6, and a second detection result or a third detection result described below. The symbol group determined by the symbol group determiner 740 may be used an as input. When it is determined that redetection is needed after the detection result is generated, the detection result may be used as an output. The output may be an input of the detection area determiner 720.

The detection area determiner 720 may determine a detection area based on a channel gain. The detection area determiner 720 may have the initial detection result or the detection result as an input. A process for determining the detection area may mean an order of ML detection. Further, the process for determining the detection area may mean the size of one of a plurality of symbol groups corresponding to a combination of available symbols when the ML detection is performed. The detection area may be determined based on a channel gain of transmission antennas, an influence of delay spread, a channel state, filter characteristics, and a signal modulation order. When the detection area is determined, the detection area may be used as an output.

The multi-symbol group generator 730 may have the detection area as an input. The multi-symbol group generator 730 may generate a plurality of symbol groups by inserting all the available symbols into the detection area. As the detection area is wider, the number of a plurality of symbol groups may exponentially increase. The plurality of symbol groups may be used as outputs.

The symbol group determiner 740 may have the plurality of symbol groups as inputs. The symbol group determiner 740 may perform ML detection based on the plurality of symbol groups as candidates. The symbol group determiner 740 may determine one symbol group having a minimum sum of Euclidean distance among the plurality of symbol groups. The determined one symbol group may be used as an output.

Figure 8:
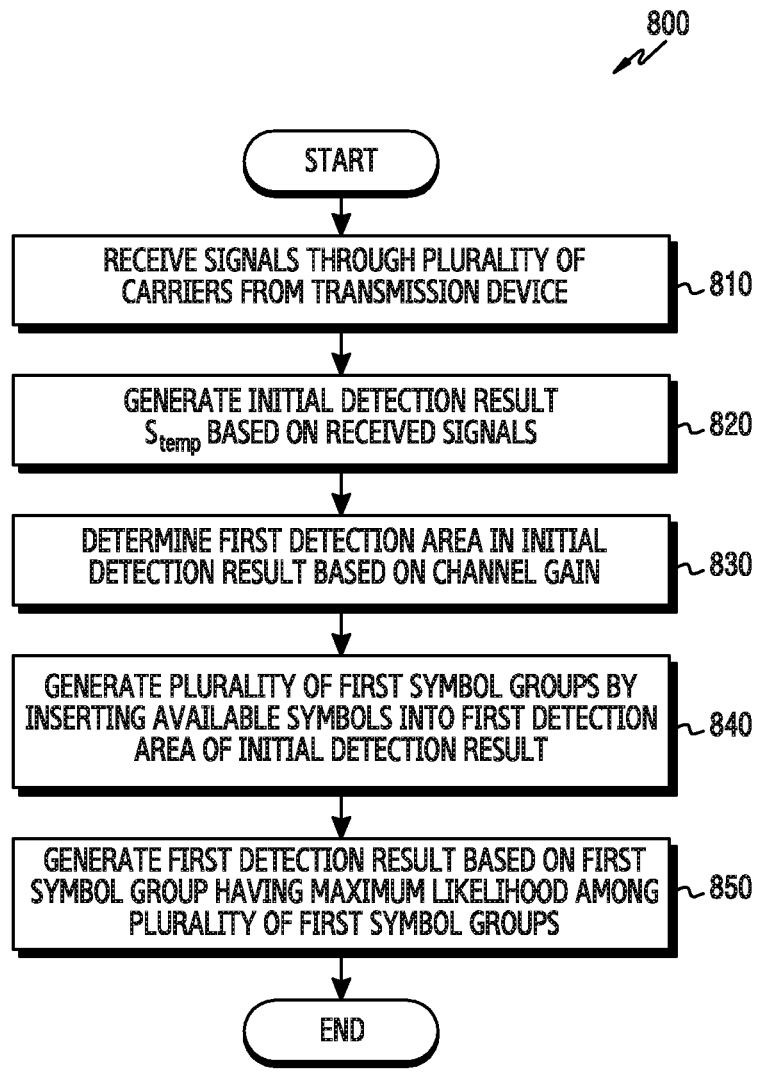
FIG. 8 is a flowchart illustrating an operation for generating a first detection result according to various embodiments of the present disclosure.

FIG. 8 is a flowchart illustrating an operation for generating a first detection result according to an embodiment. The operation flow may be performed by the reception device 120 illustrated in FIG. 1. That is, FIG. 8 illustrates an operation method of the reception device 120.

Referring to FIG. 8, in step 810, the reception device receives signals from the transmission device through a plurality of carriers. The reception device may receive signals by a receiver. The receiver may be the receiver 610 included in the reception device 120. The transmission device may be the transmission device 110 of FIG. 1.

In step 820, the controller may be configured to generate an initial detection result $S_{temp}$ based on the received signals. The controller may be the controller 620 included in the reception device 120. The controller may generate the initial detection result based on signal sequences received from the plurality of carriers, respectively. The signal sequences may correspond to the received signals.

In step 830, the controller may be configured to determine a first detection area from the initial detection result based on a channel gain. The channel gain may correspond to an average value of transmission antenna channel gains. As the channel gain is higher, an influence of interference on another detection area may be higher. As the channel gain is lower, an influence of interference on another detection area may be lower. The detection areas may correspond to one or more carriers. Accordingly, when ML detection is first performed on the first detection area having the high channel gain, an influence of carrier interference may be relatively lower compared to ML detection first performed on another detection area.

In step 830, the controller may be configured to determine a first detection area from the initial detection result based on a channel gain. The channel gain may correspond to an average value of transmission antenna channel gains. As the channel gain is higher, an influence of interference on another detection area may be higher. As the channel gain is lower, an influence of interference on another detection area may be lower. The detection areas may correspond to one or more carriers. Accordingly, when ML detection is first performed on the first detection area having the high channel gain, an influence of carrier interference may be relatively lower compared to ML detection first performed on another detection area.

In step 840, the controller may be configured to generate a plurality of first symbol groups by inserting available symbols into the first detection area of the initial detection result. A modulation scheme of the signal may be a modulation scheme of 4 QAM. In a case of the modulation scheme of 4 QAM, the available symbols may be four. When the size of the first detection area is $N_{D1}$ in consideration of the carriers and the number of antennas, the size of a plurality of first symbol groups, that is, the number of a plurality of available symbol groups may be $4^{N_{D1}}$. In step 850, the controller may be configured to generate a first detection result based on a first symbol group having maximum likelihood among the plurality of first symbol groups. The ML detection may be performed on each of the plurality of first symbol groups. The ML detection may be performed through the following process. A predetermined symbol group may be selected from the plurality of first symbol groups. The controller may measure Euclidean distance between each symbol of the selected predetermined symbol group and the signal and generate a sum by adding all of them. A symbol group having a minimum sum may be determined as the first symbol group. The first symbol group may correspond to the first detection result.

Figure 9:
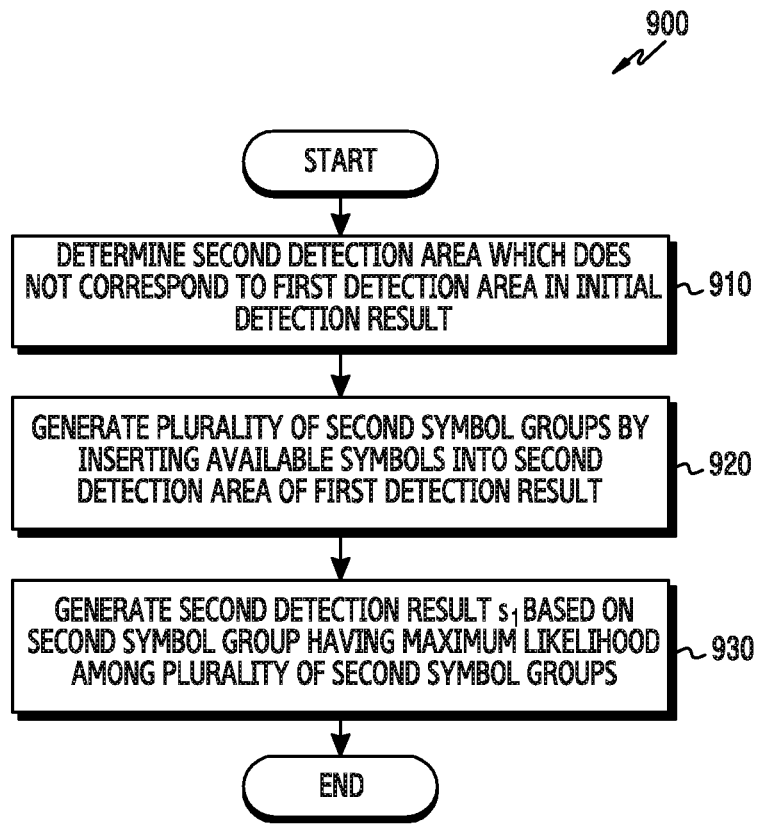
FIG. 9 is a flowchart illustrating an operation for generating a second detection result according to various embodiments of the present disclosure.

FIG. 9 is a flowchart illustrating an operation for generating a second detection result according to an embodiment. Referring to FIG. 9, in step 910, the controller may be configured to determine a second detection area which does not correspond to the first detection area from the initial detection result. The ML detection is performed on the first detection area having a high channel gain in the initial detection result. Accordingly, when the ML detection is performed on a part which does not correspond to the first detection area in the initial detection result, the ML detection may be performed in a state where an influence of interference is relatively low. The part which does not correspond to the first detection area may be the second detection area.

In step 920, the controller may be configured to generate a plurality of second symbol groups by inserting available symbols into the second detection area of the first detection result. A modulation scheme of the signal may be a modulation scheme of 4 QAM. In a case of the modulation scheme of 4 QAM, the available symbols may be four. When the size of the second detection area is $N_{D2}$ in consideration of the carriers and the number of antennas, the size of a plurality of first symbol groups, that is, the number of a plurality of available symbol groups may be $4^{N_{D2}}$.

In step 930, the controller may be configured to generate a second detection result based on a second symbol group having the maximum likelihood among the plurality of second symbol groups. The ML detection may be performed on each of the plurality of second symbol groups. The ML detection may be performed in the same way as that of the ML detection of the first detection area performed in FIG. 8. The second detection result may correspond to a detection result after the ML detection is performed on all areas in the initial detection result.

Operation 900 may include repetitive processes. In step 910, the second detection area may be divided into a plurality of detection areas. The size of a predetermined detection area of the plurality of detection areas may be equal to the size of the first detection area. A detection order of the plurality of detection areas may be determined. According to various embodiments of the present disclosure, the detection order may be determined based on an average channel gain of antennas of the transmission device. Further, the detection order may be determined based on a degree of an influence of delay spread.

In step 920, the ML detection may be repeatedly performed according to the detection order. When the ML detection is performed on an $i^{th}$ detection area among the plurality of detection areas, results of the ML detection that has been performed up to an $i-1^{th}$ detection area are accumulated and reflected. According to various embodiments of the present disclosure, complexity may exponentially decrease by a ratio between the size of the detection result and the size of the detection area, but an influence of interference by a carrier having a high channel gain may be considered.

When the ML detection is performed on all of the plurality of detection areas, the second result may be generated in step 930. The second detection result may be generated in consideration of an influence of inter-carrier interference. Further, complexity may be reduced by performing the ML detection on the divided detection areas compared to a case where the plurality of symbol groups are generated and then the ML detection is performed on all the areas.

Figure 10:
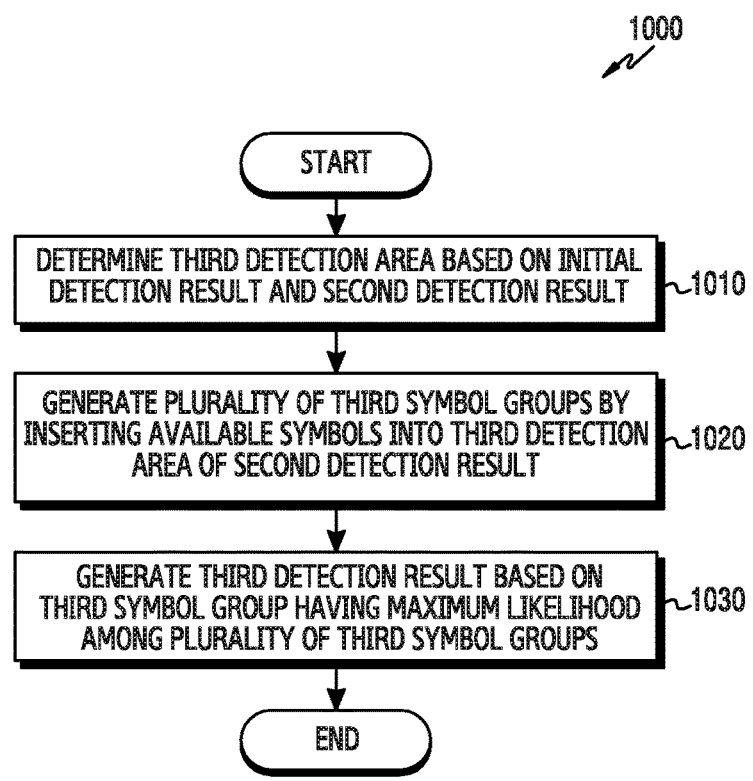
FIG. 10 is a flowchart illustrating an operation for generating a third detection result according to various embodiments of the present disclosure.

FIG. 10 is a flowchart illustrating an operation for generating a third detection result according to an embodiment. Referring to FIG. 10, in step 1010, the controller may be configured to determine a third detection area based on the initial detection result and the second detection result. According to various embodiments, the third detection area may be determined through a comparison between each symbol and the initial detection result and each symbol and the second detection result. The third detection area may be determined as a non-corresponding area based on the comparison. Detailed operations thereof will be described below. According to various embodiments, the third detection area may be determined based on Euclidean distance between the received signal and the initial detection result and Euclidean distance between the received signal and the first detection result. Detailed operations thereof will be described below.

According to various embodiments, when a channel gain of at least one of the plurality of carriers is smaller than an average value of Signal-to-Interference Ratios (SIRs) required for detecting a symbol group having the maximum likelihood, the third detection area may correspond to the at least one carrier. Detailed operations thereof will be described below.

Figure 11:
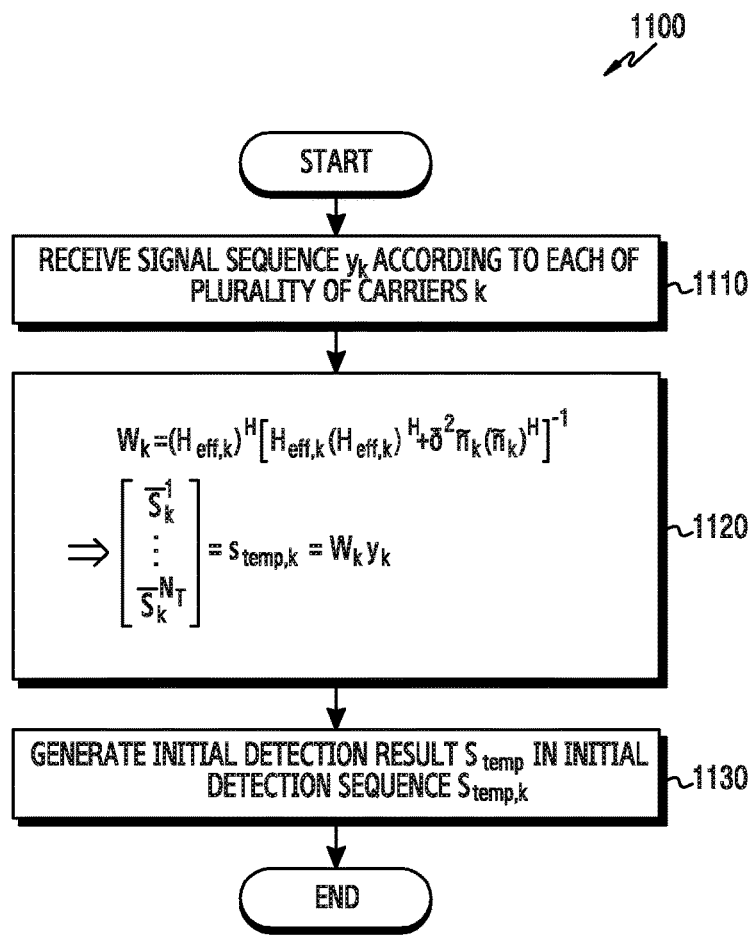
FIG. 11 is a flowchart illustrating an operation for generating an initial detection result based on a signal received by a receiver according to various embodiments of the present disclosure.

FIG. 11 is a flowchart illustrating an operation for generating the initial detection result based on the signal received by the receiver according to an embodiment. The operation flow may be performed by the reception device 120 illustrated in FIG. 1. Referring to FIG. 11, in step 1110, the reception device 120 may receive a signal sequence by each of a plurality of carriers in step 1110. The signal sequence may be received through a per-tone linear receiver with respect to each carrier. The signal sequence received for a $k^{th}$ carrier may be indicated by $y_k$.

In step 1120, the reception device generates an initial detection sequence. When the initial detection sequence is generated, the reception device cannot help considering inter-subcarrier interference. Specifically, the reception device may generate a weighted value matrix by using a channel matrix, a Hermitian matrix of the channel matrix, and a noise vector, and generate an initial detection sequence by multiplexing the received signal by the weighted value matrix. For example, the signal sequence $y_k$ may generate an initial detection sequence $S_{temp, k}$ for carrier k based on the following equation.

$$W_k = (H_{eff,k})^H [H_{eff,k}(H_{eff,k}) + \sigma^2 \tilde{n}_k (\tilde{n}_k)^H]^{-1} \quad (3)$$

$$\Rightarrow \begin{bmatrix} \overline{s}_k^1 \\ \vdots \\ \overline{s}_k^{N_T} \end{bmatrix} = s_{temp,k} = W_k y_k$$

$H_{eff, k}$ denotes a channel matrix for an effective channel of a $k^{th}$ carrier, $\sigma$ denotes a standard deviation of noise, and $\tilde{n}_k$ denotes a noise matrix of the $k^{th}$ carrier.

In step 1130, an initial detection result $S_{temp}$ may be generated based on a plurality of initial detection sequences generated for respective carriers. When the number of carriers is C, the initial detection result of the number of symbols corresponding to C times of a number of symbols of one initial detection sequence included in the plurality of initial detection sequences may be generated. The initial detection result may be generated by accumulating initial detection sequences corresponding to a first carrier to a last carrier.

Figure 12:
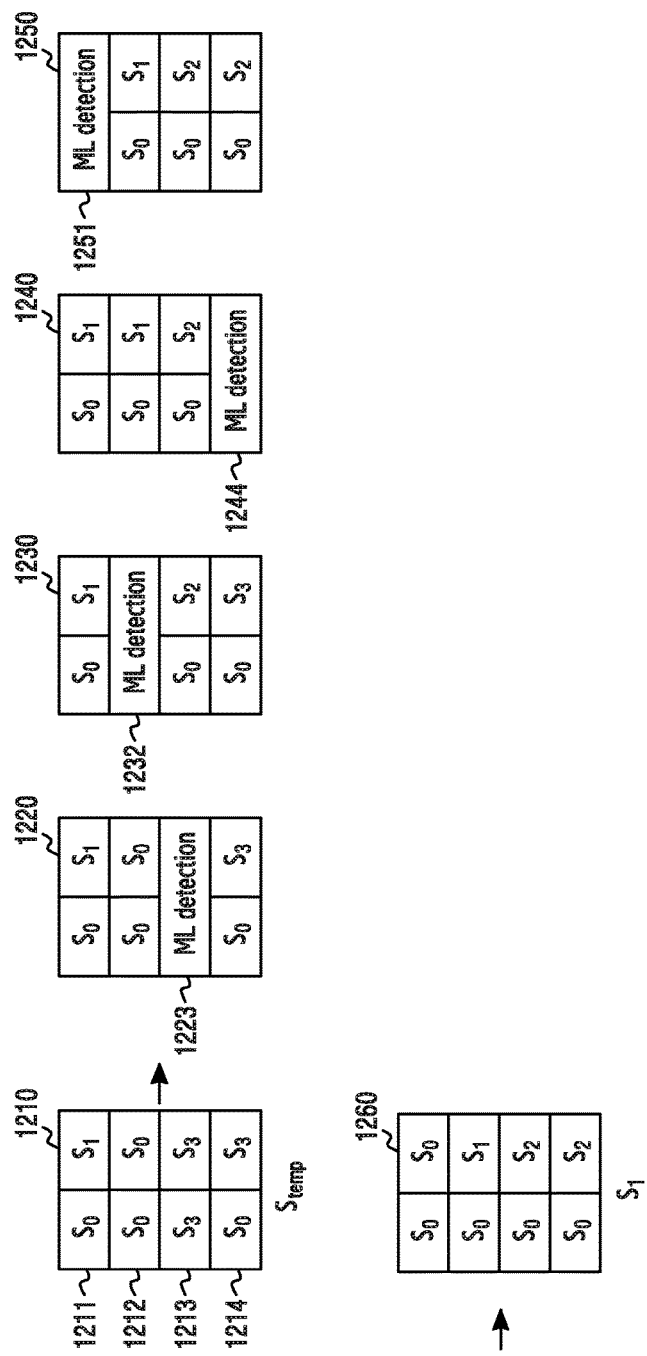
FIG. 12 illustrates an operation for maximum likelihood detection based on a partial candidate according to various embodiments of the present disclosure.

FIG. 12 illustrates an operation for detecting the maximum likelihood based on a partial candidate according to various embodiments.

Referring to FIG. 12, the operation may be performed by the controller 620 illustrated in FIG. 6. The number of carriers may be four, which corresponds to a multi-carrier system. The number of transmission antennas is two and the number of reception antennas is two, which corresponds to a MIMO system.

A symbol group 1210 may correspond to the initial detection result. A horizontal axis may indicate the number of transmission antennas and a vertical axis may indicate the number of carriers. The multi-carrier system may include a carrier 1211, a carrier 1212, a carrier 1213, and a carrier 1214. A signal modulation scheme may correspond to a modulation scheme of 4 QAM. In a case of the modulation scheme of 4 QAM, the number of cases which one carrier or one antenna may have is four. The symbols may be $S_0$, $S_1$, $S_2$, and $S_3$.

The controller 620 may divide the initial detection result into a plurality of detection areas having a predetermined size. Thereafter, the controller 620 may determine an order of maximum likelihood detection. The detection order may be determined based on a channel gain. The detection order may be determined in a frequency domain based on an antenna having a high average channel gain of the transmission antennas. The detection order may be determined in a time domain to first detect a sub-symbol receiving the smallest influence of delay spread in an FBMC system. The predetermined size may be actively set according to channel or filter characteristics and modulation schemes. According to various embodiments of the present disclosure, the detection order may be determined by measuring a Signal-to-Interference Ratio (SIR) based on the channel state and the filter characteristics and then controlling the number of subcarriers to be used for the ML detection based on the SIR. According to various embodiments of the present disclosure, the predetermined size may be determined according to a modulation order.

A first detection area in which the ML detection is first performed is determined. The first detection area has a predetermined size as described above and corresponds to first detection in the detection order. The first detection area may correspond to a detection area 1223. An initial detection result 1210 may have 8 resources. The controller 620 may determine the first detection area with the size of 2 resources.

The controller 620 may determine the detection order such as the detection area 1223 corresponding to the carrier 1213, the detection area 1232 corresponding to the carrier 1212, the detection area 1244 corresponding to the carrier 1214, and the detection area 1251 corresponding to the carrier 1211 based on the channel gain. The symbol group actually transmitted by the transmission device may be the symbol group illustrated in FIG. 5. A detection result 1220 may correspond to the initial detection result 1210.

A detection result 1230 may be generated by performing the ML detection on the detection area 1223 in the detection result 1220. In the detection area 1223, [$s_0$, $s_2$] may be detected. An influence of interference may be compensated for by the symbols of the initial detection result 1210. When the ML detection is performed on the detection area 1223, symbols of the area which does not correspond to the detection area 1223 among the detection result 1220 may be also used for performing the ML detection. Such use may consider the influence of interference. The influence of interference may be considered by first performing the ML detection on the detection area 1223 having small influence of interference by adjacent carriers and then performing the ML detection on another detection area. The repetitive generation of new detection results in the initial detection result 1210 may allow proximity to the symbol group actually transmitted by the transmission device.

The detection result 1230 may correspond to the first detection result. A detection result 1240 may be generated by performing the ML detection on the detection area 1232 in the detection result 1230. In the detection area 1232, [$s_0$, $s_1$] may be detected. A detection result 1250 may be generated by performing the ML detection on the detection area 1244 in the detection result 1240. In the detection area 1244, [$s_0$, $s_2$] may be detected. A detection result 1260 may be generated by performing the ML detection on the detection area 1251 in the detection result 1250. In the detection area 1251, [$s_0$, $s_0$] may be detected. The detection result 1260 corresponds to the second detection result $S_1$.

Figure 13:
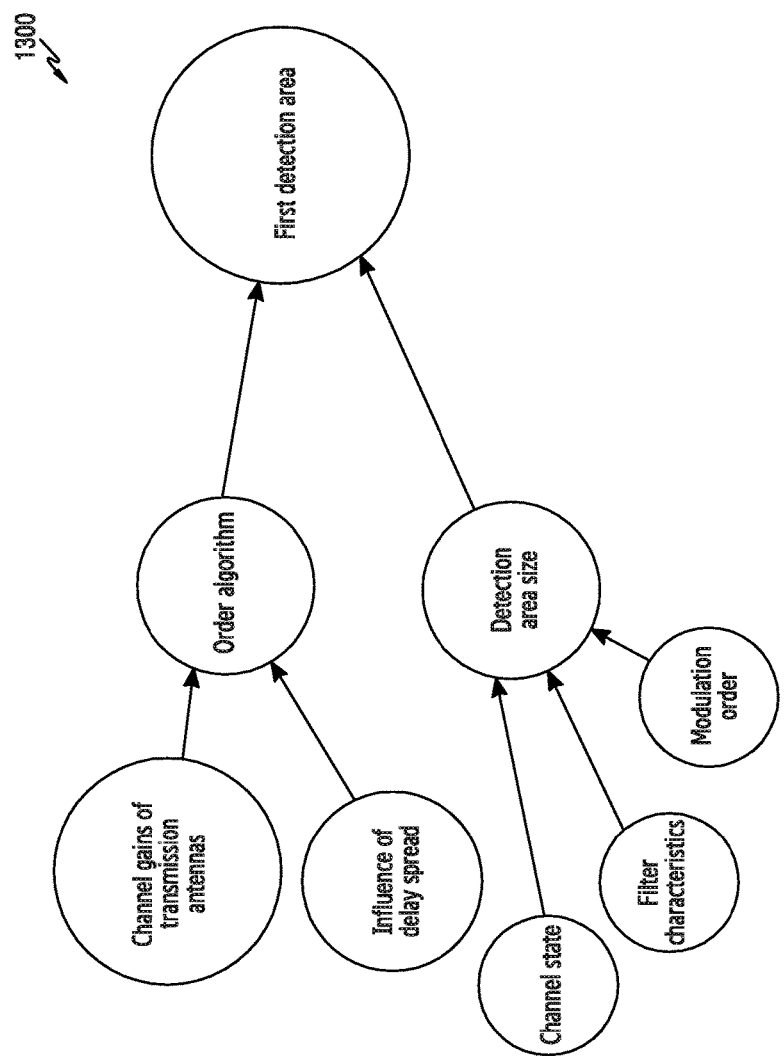
FIG. 13 illustrates references required for determining a first detection area according to various embodiments of the present disclosure.

FIG. 13 illustrates references required for determining the first detection area according to an embodiment.

Referring to FIG. 13, the determination of the first detection area means determination of a predetermined size of the detection area and determination of a priority in the detection order as described above. The predetermined size of the detection area may be determined according to a channel state. The channel state may include an average channel gain of transmission antennas. Further, the predetermined size may be determined according to a modulation order. In a case of 4 QAM, the modulation order may be a fourth-order. Further, the predetermined size may be determined according to filter characteristics in the FBMC system. An order algorithm for determining the priority of the detection area may be determined according to an average channel gain of transmission antennas. Further, the priority may be determined based on an influence of delay spread.

Figure 14:
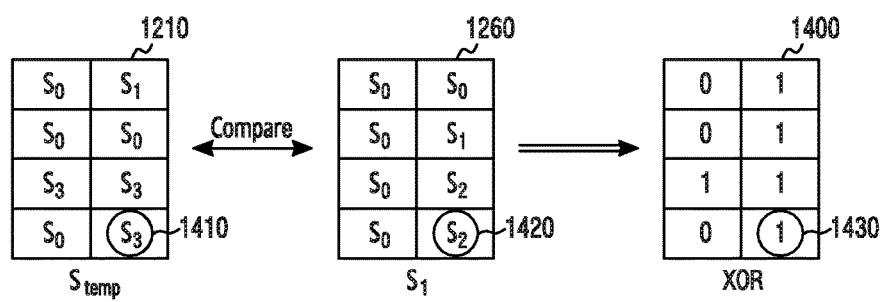
FIG. 14 illustrates an operation for determining a third detection area through a comparison between symbols according to various embodiments of the present disclosure.

FIG. 14 illustrates an operation for determining a third detection area through a comparison between symbols according to an embodiment.

Referring to FIG. 14, the third detection area may be a detection area which does not correspond to the second detection result in the initial detection result. The controller included in the device according to various embodiments may perform an XOR algorithm between symbols with respect to the initial detection result 1210 and the second detection result 1260. The XOR algorithm may generate a result of 0 for the same values and generate a result of 1 for different values. For example, a symbol 1410 corresponds to $S_3$ and a symbol 1420 corresponds to $S_1$, which are different values, so that a result of 1 may be generated in a resource corresponding to the symbol 1410 and the symbol 1420 of the detection result 1400. When the XOR algorithm is performed, a detection result 1400 may be generated. A resource having 1 as an element in the detection result 1400 may correspond to the third detection area. That is, resources having 1 as the element may be targets for re-detection.

Figure 15:
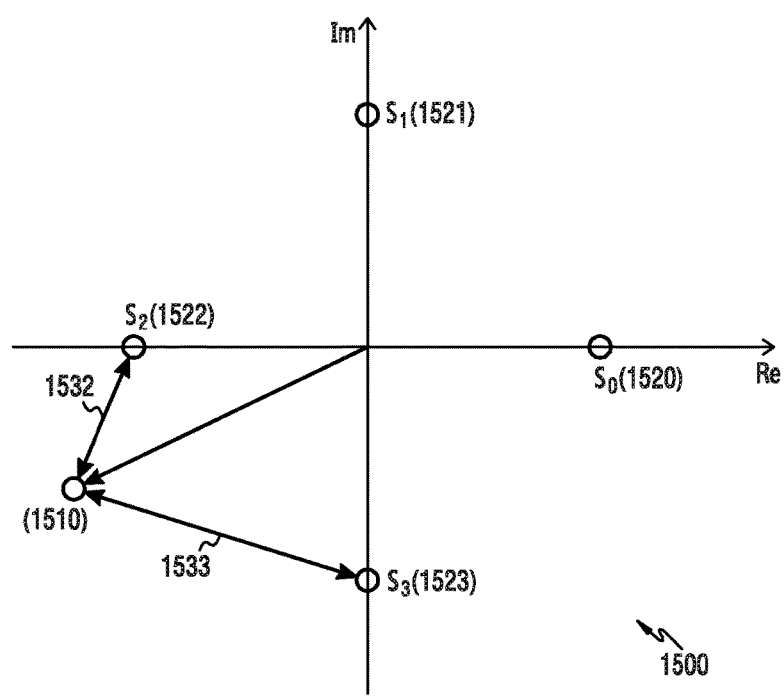
FIG. 15 illustrates an operation for comparing Euclidean distances to determine a third detection area according to various embodiments of the present disclosure.

FIG. 15 illustrates an operation for comparing Euclidean distances to determine a third detection area according to an embodiment. Referring to FIG. 15, the third detection area may be determined based on a Euclidean distance between the received signal and the initial detection result and a Euclidean distance between the received signal and the first detection result.

A constellation 1500 corresponds to a constellation according to a modulation scheme of 4 QAM. The constellation 1500 may include a reception vector 1510. The vector 1510 may correspond to a part of the signal received by the reception device. The constellation 1500 may include constellation points 1520, 1521, 1522, and 1523. The constellation 1500 may be the resource corresponding to the symbol 1410 and the symbol 1420 of FIG. 14.

$S_{temp}$ corresponds to the constellation point 1523 $s_3$ in the resource, and $S_1$ corresponds to the constellation point 1522 $s_2$ in the resource. $S_{temp}$ and $S_1$ correspond to a distance 1532 and a distance 1533, respectively. A third detection area may be determined based on the distance 1532, the distance 1533, and the following equation.

$$\frac{\|y_{tot} - H_{eff,tot}S_{temp}\|_F^2}{\|y_{tot} - H_{eff,tot}s_1\|_F^2} < \rho_R \quad (4)$$

$y_{tot}$ denotes all signal sequence values for all carriers, $H_{eff, tot}$ denotes the whole channel matrix for all carriers, and $\rho_R$ denotes a threshold value.

The threshold value may be determined according to an SIR or a modulation order of the received signal. When equation (4) is met, the reception device may determine the threshold as the third detection area requiring re-detection. When equation (4) above is not met, the reception device does not determine the detection area for re-detection anymore.

Figure 16:
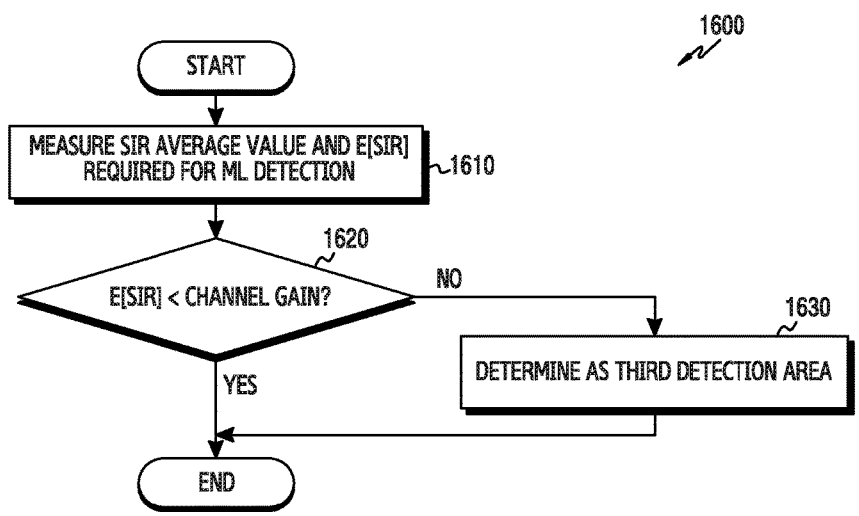
FIG. 16 is a flowchart illustrating an operation for determining a third detection area through an SIR average value required for ML detection according to various embodiments of the present disclosure.

FIG. 16 is a flowchart illustrating an operation of determining a third detection area through an SIR average value required for ML detection. Referring to FIG. 16, in step 1610, an SIR value required for every detection area for ML detection is measured. An average value of the SIR values is generated. The detection area may be at least one carrier. In addition to the SIR, an SINR, a CIR, and a CINR indicating channel quality may be used. When a channel gain of the detection area is larger than the average value in step 1620, the detection operation may end. That is, the reception device terminates the detection procedure without further ML detection. When the channel gain of the detection area is not larger than the average value in step 1630, the reception device may determine the detection area as the third detection area. Thereafter, the algorithm may end. Although not illustrated in FIG. 16, the reception device may perform detection on the third detection area after step 1630. For example, for the third detection area, the reception device may perform the operation described with reference to FIG. 10. Referring to FIG. 10 described above, a third detection result may be generated.

Figure 17:
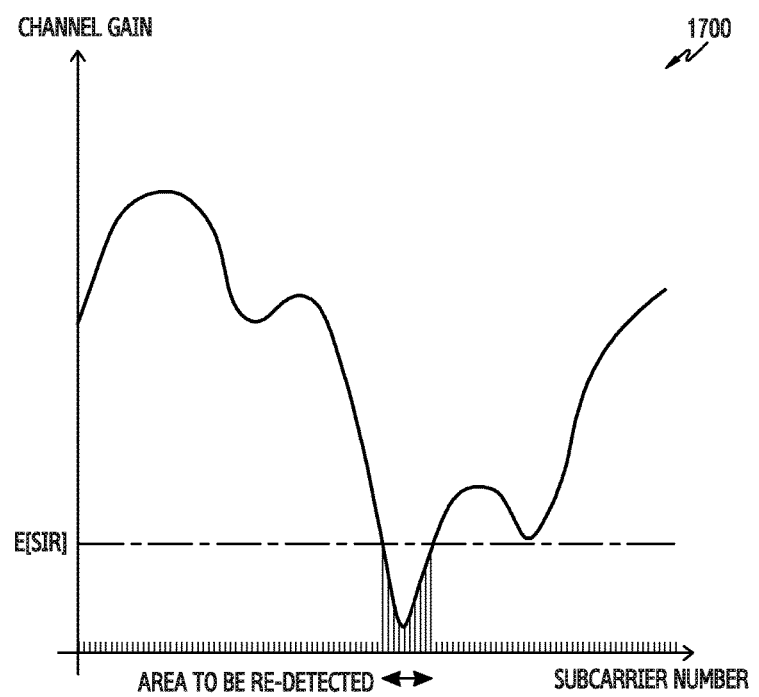
FIG. 17 illustrates an operation for determining a third detection area based on a comparison between an SIR average value required for ML detection and a channel gain according to various embodiments of the present disclosure.

FIG. 17 illustrates an operation of determining a third detection area based on a comparison between an SIR average value required for ML detection and a channel gain. Referring to FIG. 17, a horizontal axis may indicate a subcarrier index and a vertical axis may indicate a subcarrier channel gain. An E[SIR] value corresponding to the SIR average value required for ML detection may be generated.

When the subcarrier channel gain is smaller than the E[SIR] value, the subcarrier may be determined as the third detection area corresponding to the re-detection area. When the subcarrier channel gain is smaller than the E[SIR] value, it may be difficult to guarantee reliability of the ML detection. Thereafter, a third detection result may be generated.

According to various embodiments, when a channel gain of at least one of the plurality of carriers is smaller than an average value of Signal-to-Interference Ratios (SIRs) required for detecting a symbol group having maximum likelihood, the third detection area may correspond to the at least one carrier. In addition to the SIR, an SINR, a CIR, and a CINR indicating channel quality may be used.

Figure 18A:
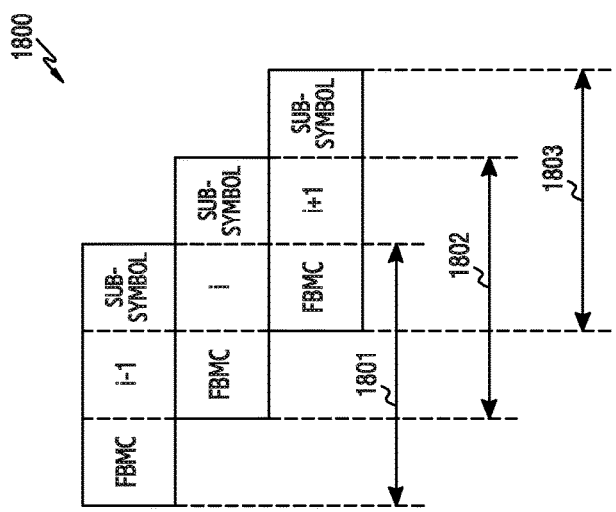
FIGS. 18A and 18B illustrate a model of an FBMC system according to various embodiments of the present disclosure.
Figure 18B:
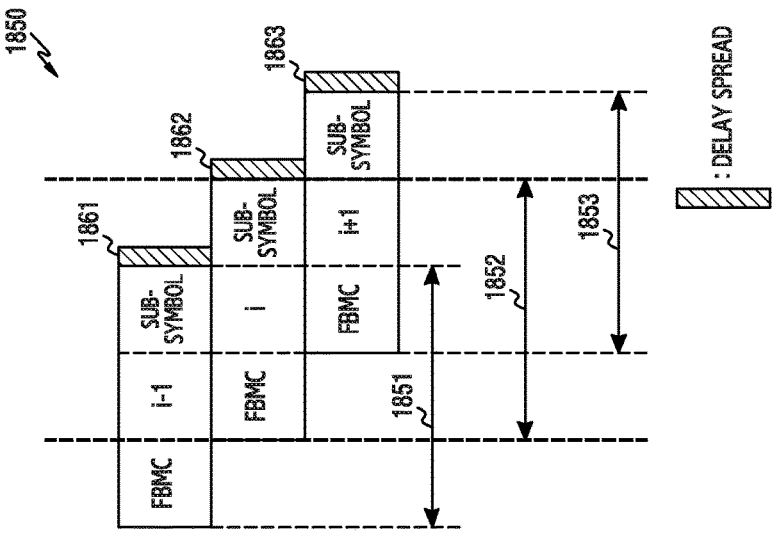

FIGS. 18A and 18B illustrate a model of the FBMC system.

Referring to FIG. 18A, an FBMC system 1800 indicates an ideal model of the FBMC system. In the ideal mode, a time interval 1801 exactly corresponds to an FBMC i−1 sub-symbol, a time interval 1802 exactly corresponds to an FBMC i sub-symbol, and a time interval 1803 exactly corresponds to an FBMC i+1 sub-symbol. Accordingly, in the time interval 1802, the last two-thirds of the FBMC i−1 sub-symbol, the entirety of the FBMC i sub-symbol and the first two-thirds of the FBMC i+1 sub-symbol may be received.

Referring to FIG. 18B, an FBMC system 1850 indicates a real model of the FBMC system. In the real model, a time interval 1851 may correspond to an FBMC i−1 sub-symbol, a time interval 1852 may correspond to an FBMC i sub-symbol, and a time interval 1853 may correspond to an FBMC i+1 sub-symbol. However, unlike the ideal model, a delay spread phenomenon shows a delay of a reception time for each sub-symbol. The FBMC i−1 sub-symbol may correspond to a delay spread 1861, the FBMC i sub-symbol may correspond to a delay spread 1862, and the FBMC i+1 sub-symbol may correspond to a delay spread 1863. In the time interval 1802, the delay spread 1861 may be also received in addition to the last two-thirds of the FBMC i−1 sub-symbol, the entirety of the FBMC i sub-symbol and the first two-thirds of the FBMC i+1 sub-symbol. This may cause the detection of a transmitted signal from a received signal to be difficult. In the time interval corresponding to a large influence of the delay spread, reception of a high reliable signal may be difficult. When the reliability is not high, it is difficult to accurately grasp the influence of interference and an error probability may also increase. Accordingly, it is required to determine the detection order starting from the delay spread with the lowest influence.

Figure 19:
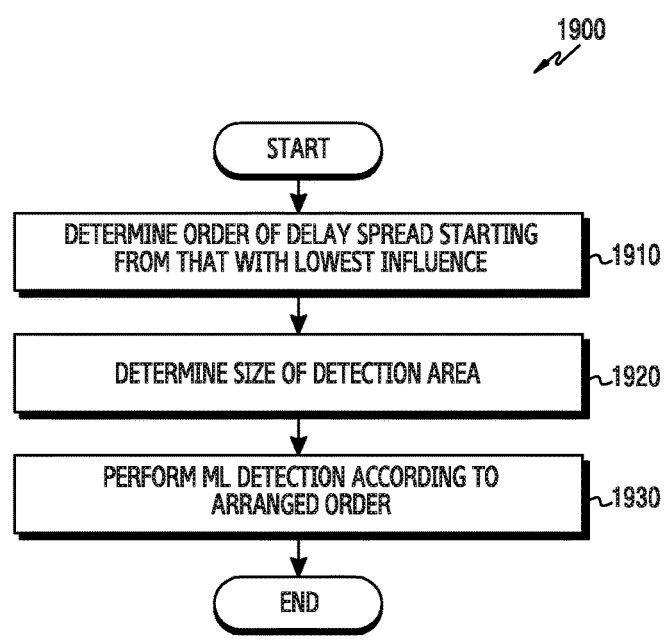
FIG. 19 is a flowchart illustrating an operation for performing ML detection in consideration of a delay spread according to various embodiments of the present disclosure.

FIG. 19 is a flowchart illustrating an operation of performing ML detection in consideration of a delay spread according to an embodiment.

Referring to FIG. 19, in step 1910, an order of the delay spread starting from that with the lowest influence may be determined in a time domain. In the FBMC system, an effective channel of each FBMC sub-symbol including a Carrier Frequency Offset (CFO) and time dependency of a current channel may be estimated. An SIR of the effective channel of each FBMC sub-symbol may be measured and used as an index of the generated delay spread.

In step 1920, a size of the detection area is determined. The size of the detection area may be the size of the first detection area. According to various embodiments, the size of the detection area may be determined based on channel gains of transmission antennas, an influence of the delay spread, a channel state, filter characteristics, and a signal modulation order. In step 1930, ML detection may be performed according to the order determined in step 1910.

The ML detection may be performed in the unit corresponding to the size of the detection area determined in step 1920. The controller included in the device according to various embodiments may be configured to determine the first detection area based on delay spread information of the signal.

Figure 20:
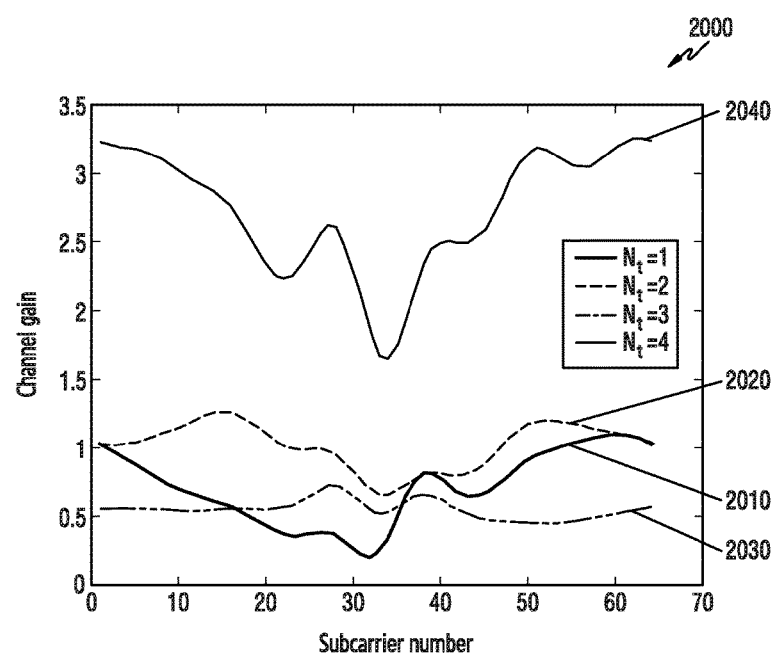
FIG. 20 illustrates a channel gain of a transmission antenna in a wireless communication system according to various embodiments of the present disclosure.

FIG. 20 illustrates a channel gain of the transmission antenna in the wireless communication system.

Referring to FIG. 20, the number of transmission antennas may be four. The number of reception antennas may be four. The number of subcarriers may be 64. A horizontal axis may indicate a subcarrier index and a vertical axis may indicate a channel gain of the transmission antenna. When the detection order is determined in the ML detection, it may be not easy to determine an order for the antenna domain. As illustrated in FIG. 20, a case of antenna 4 ($N_t$=4) certainly has a high channel gain but determining orders of other channel gains considering both a predetermined antenna and a predetermined carrier may not be easy. The reference for determining the order may be inaccurate. According to various embodiments of the present disclosure, a transmission antenna-specific average channel gain for a frequency domain may show characteristics of all frequency areas. When the transmission antenna-specific average channel gain is used, in a problem of determining the order, there is an advantage of solving a two dimensional problem (frequency and antenna) one dimensionally.

Figure 21A:
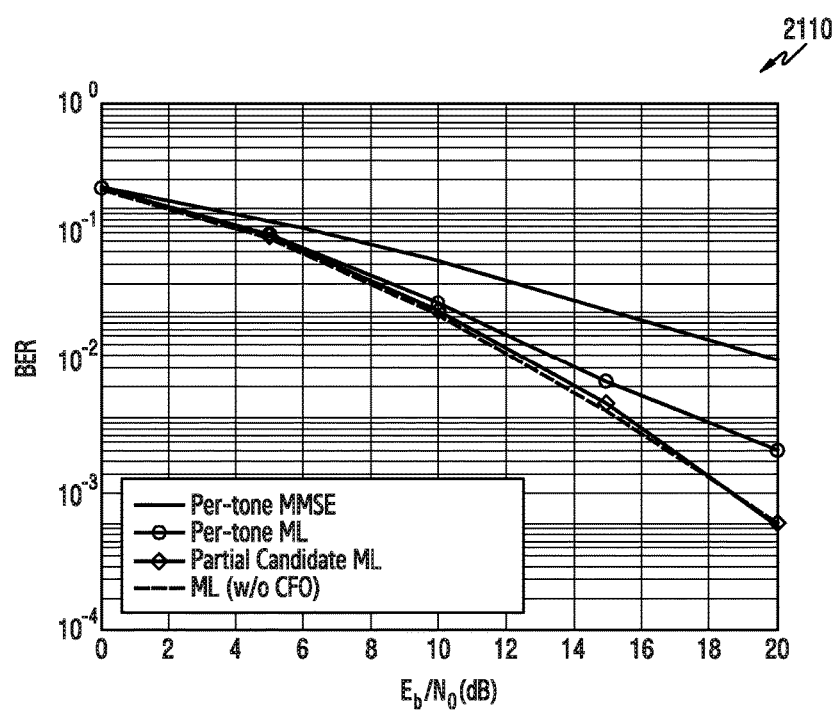
FIG. 21A illustrates a bit error rate (BER) performance in a MIMO-OFDM system according to various embodiments of the present disclosure.

FIG. 21A illustrates a BER performance according to various embodiments of the present disclosure and a BER performance according to the conventional scheme in a MIMO-OFDM system. Referring to FIG. 21A, a horizontal axis may be a ratio $E_b/N_0$ of bit energy to noise power density. The unit of the ratio is dB. $E_b$ may denote energy per bit and $N_0$ may denote a noise power spectrum density. A vertical axis may be a Bit Error Rate (BER). The BER may refer to a ratio of the number of error bits to the total number of transmitted bits. In the same BERs, as the required $E_b/N_0$ is smaller, the detection process may be more efficient. In the same $E_b/N_0$, as the BER performance is smaller, the detection process may be more efficient. Parameters of a graph 2110 are shown in Table 1 below.

TABLE 1

| Parameter | Value |
| --- | --- |
| Multi-carrier | OFDM |
| Number of transmission antennas | 2 |
| Number of reception antennas | 2 |
| Number of subcarriers | 128 |
| Modulation scheme | 4 QAM |
| Channel | ITU vehicular |
| Carrier Frequency Offset (CFO) | 0.05 |

Referring to the graph 2110, various embodiments of the present disclosure may correspond to "Partial Candidate ML". The "Partial Candidate ML" may have a significantly better performance compared to the "per-tone ML" that performs the ML detection on every carrier. In the same $E_b/N_0$, the "Partial Candidate ML" may have a lower BER compared to the "per-tone ML". Further, the "Partial Candidate ML" may have a performance close to "ML (w/o CFO)" having no CFO compared to the "per-tone ML". The "ML (w/o CFO)" may refer to an environment having no interference and may have an optimal BER performance.

Figure 21B:
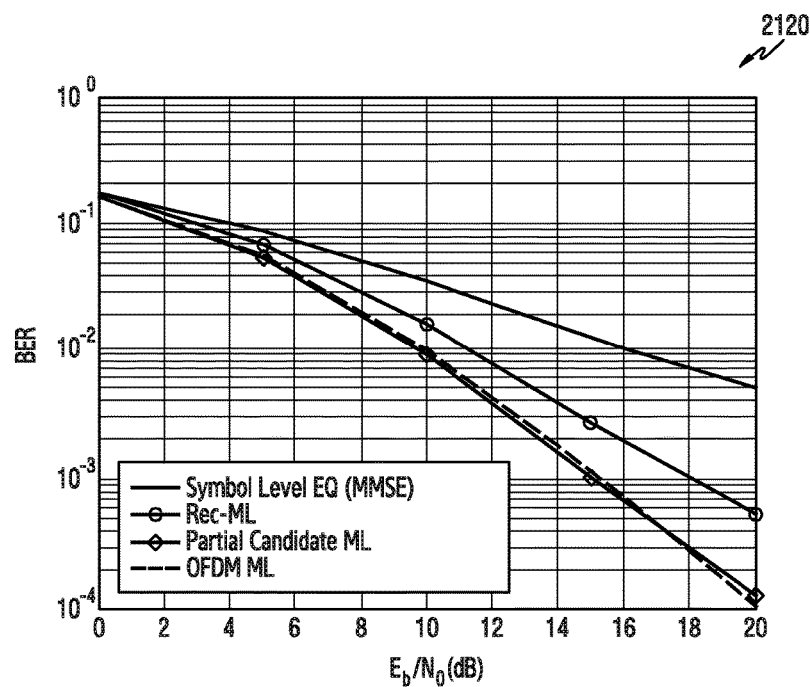
FIG. 21B illustrates a graph illustrating a BER performance in a MIMO-FBMC system according to various embodiments of the present disclosure.

FIG. 21B illustrates a BER performance according to various embodiments of the present disclosure and a BER performance according to the conventional scheme in a MIMO-FBMC system. Referring to FIG. 21B, a horizontal axis may indicate a ratio $E_b/N_0$ of bit energy to noise power density. The unit of the ratio is dB. A vertical axis may be a Bit Error Rate (BER). Parameters of a graph 2120 are shown in Table 2 below.

TABLE 2

| Parameter | Value |
| --- | --- |
| Multi-carrier | FBMC |
| Number of transmission antennas | 2 |
| Number of reception antennas | 2 |
| Number of subcarriers | 128 |
| Modulation scheme | 4 QAM |
| Channel | ITU vehicular |
| Filterbank | PHYDYAS, Yonl |

Referring to the graph 2120, various embodiments of the present disclosure may correspond to "Partial Candidate ML". The "Partial Candidate ML" has a larger gain compared to "Rec-ML" with interference cancellation. However, compared to "OFDM ML", the same performance may be obtained in terms of the BER.

Figure 21C:
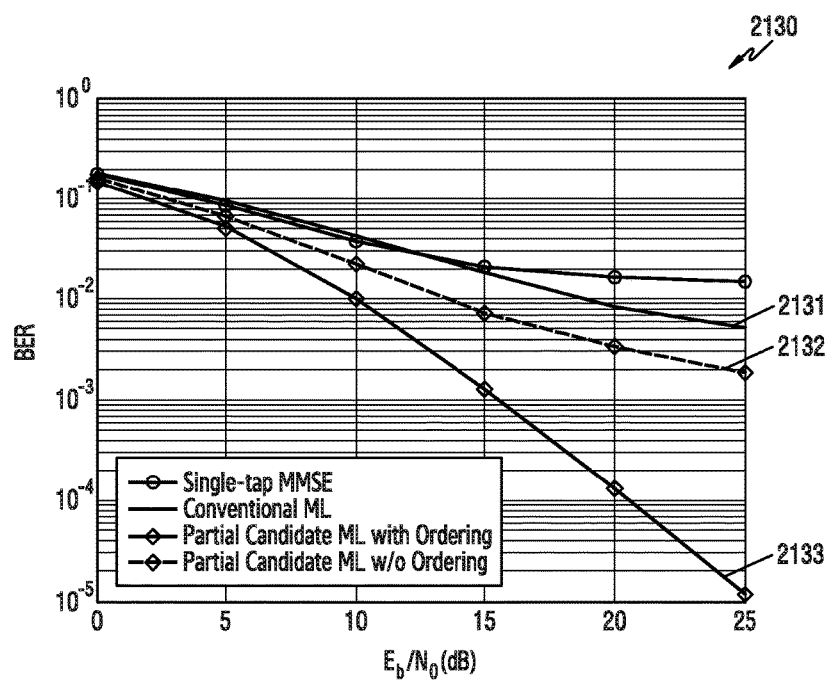
FIG. 21C illustrates a BER performance in a MIMO-FBMC system according to various embodiments of the present disclosure.

FIG. 21C illustrates a BER performance according to various embodiments of the present disclosure and a BER performance according to the conventional scheme based on whether an order algorithm is applied in a MIMO-FBMC system. Referring to FIG. 21C, a horizontal axis may indicate a ratio $E_b/N_0$ of bit energy to noise power density. The unit of the ratio is dB. A vertical axis may be a Bit Error Rate (BER). Parameters of a graph 2130 are shown in Table 3 below.

TABLE 3

| Parameter | Value |
| --- | --- |
| Multi-carrier | OFDM |
| Number of transmission antennas | 2 |
| Number of reception antennas | 2 |
| Number of subcarriers | 128 |
| Modulation scheme | 4 QAM |
| Channel | ITU vehicular |
| Carrier Frequency Offset (CFO) | 0.15 |

Referring to the graph 2130, it may be noted that a performance gain is very large when the "Partial Candidate ML" according to various embodiments of the present disclosure is detected based on signals found by a per-tone linear receiver. Further, the performance of a "partial candidate ML detection scheme" may be improved by determining an order.

Figure 22A:
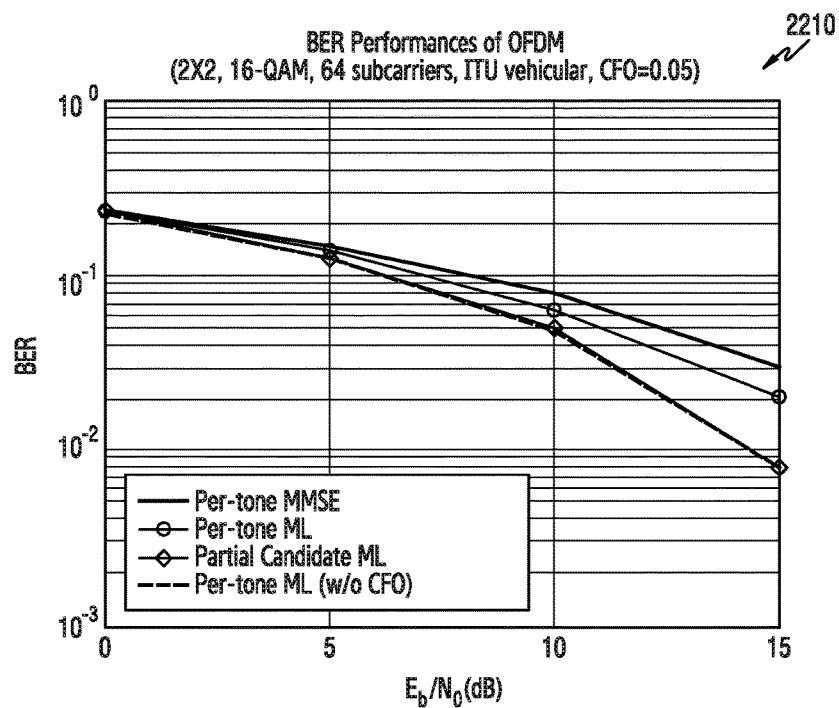
FIG. 22A illustrates a BER performance in a MIMO-OFDM system according to various embodiments of the present disclosure.

FIG. 22A illustrates a BER performance according to various embodiments of the present disclosure and a BER performance according to the conventional scheme in a MIMO-OFDM system. A horizontal axis may indicate a ratio $E_b/N_0$ of bit energy to noise power density. The unit of the ratio is dB. A vertical axis may be a Bit Error Rate (BER). Parameters of a graph 2210 are shown in Table 4 below.

TABLE 4

| Parameter | Value |
| --- | --- |
| Multi-carrier | OFDM |
| Number of transmission antennas | 2 |
| Number of reception antennas | 2 |
| Number of subcarriers | 64 |

TABLE 4-continued

| Parameter | Value |
| --- | --- |
| Modulation scheme | 16 QAM |
| Channel | ITU vehicular |
| Carrier Frequency Offset (CFO) | 0.05 |

Referring to the graph 2210, a trend similar to FIG. 21A may be shown. When "Per-tone ML" is used, the SIR cannot be guaranteed, so that an error flooring phenomenon may occur. As described above, a BER performance almost approximate to optimal "ML (/0 CFO)" is shown.

Figure 22B:
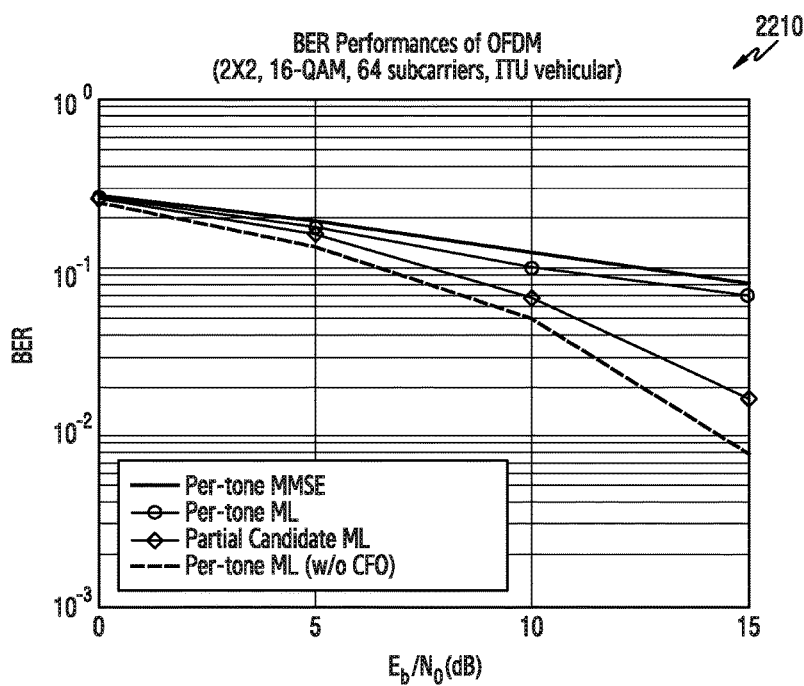
FIG. 22B illustrates a BER performance in a MIMO-FBMC system according to various embodiments of the present disclosure.

FIG. 22B illustrates a BER performance according to various embodiments of the present disclosure and a BER performance according to the conventional scheme in a MIMO-FBMC system. A horizontal axis may indicate a ratio $E_b/N_0$ of bit energy to noise power density. The unit of the ratio is dB. A vertical axis may be a Bit Error Rate (BER). Parameters of a graph 2220 are shown in Table 5 below.

TABLE 5

| Parameter | Value |
| --- | --- |
| Multi-carrier | FBMC |
| Number of transmission antennas | 2 |
| Number of reception antennas | 2 |
| Number of subcarriers | 64 |
| Modulation scheme | 16 QAM |
| Channel | ITU vehicular |

Referring to the graph 2220, a trend similar to FIG. 21B may be shown. However, compared to "OFDM ML", the performance may deteriorate in terms of the BER. This may be a phenomenon occurring as the modulation order of the modulation scheme increases from 4 to 16. According to various embodiments of the present disclosure, the optimization may be made by re-determining the detection area to be re-detected through a detailed comparison between the initial detection result and the third detection result and re-performing the ML detection.

Figure 23:
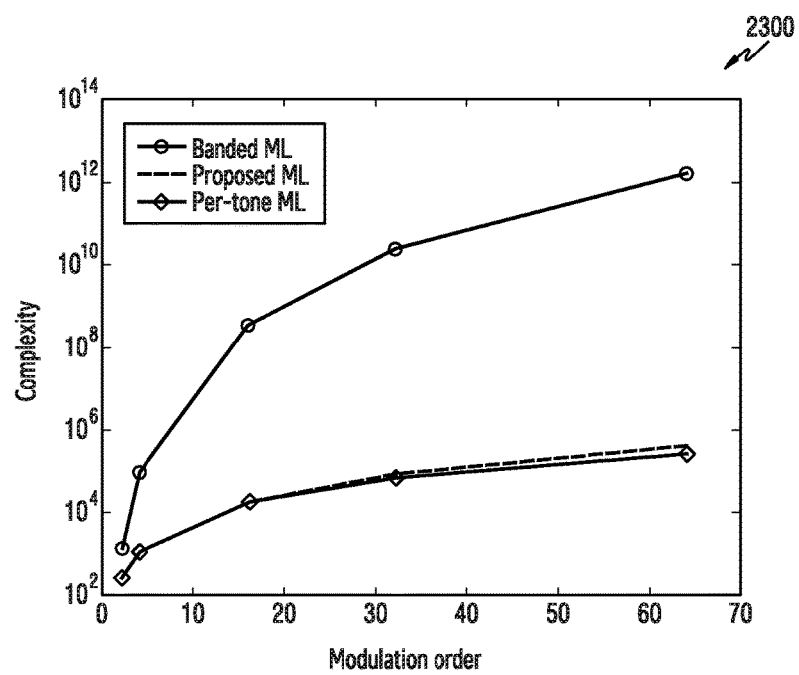
FIG. 23 illustrates complexity for modulation orders according to various embodiments of the present disclosure.

FIG. 23 illustrates complexity for modulation orders according to various embodiments of the present disclosure and the conventional scheme. In FIG. 23, a horizontal axis may indicate a modulation order and a vertical axis may indicate complexity. "Banded ML' may refer to a scheme for also performing ML detection around the detection area in order to consider interference between adjacent carriers. However, since the number of available symbol groups exponentially increases, there may be a disadvantage in terms of complexity. "partial candidate ML" according to various embodiments of the present disclosure may have the same complexity as that of the convention "Per-ton ML" in terms of complexity as illustrated in FIG. 23, but have a larger gain in terms of the BER performance as described above.

The operation method of the apparatus according to various embodiments described above may include an operation of generating an initial detection result based on signals received through a plurality of carriers from a transmission device, an operation of determining a first detection area in the initial detection result based on a channel gain; generating a plurality of first symbol groups by inserting available symbols into the first detection area of the initial detection result, and an operation of generating a first detection result based on a first symbol group having the maximum likelihood among the plurality of first symbol groups.

The operation method of the apparatus according to various embodiments described above may further include an operation of determining a second detection area different from the first detection area in the initial detection result, an operation of generating a plurality of second symbol groups by inserting available symbols into the second detection area of the first detection result, and an operation of generating a second detection result based on a second symbol group having the maximum likelihood among the plurality of second symbol groups.

The operation method of the apparatus according to various embodiments described above may further include an operation of determining a third detection area based on the initial detection result and the second detection result, an operation of generating a plurality of third symbol groups by inserting available symbols into the third detection area of the second detection result, and an operation of generating a third detection result based on a third symbol group having the maximum likelihood among the plurality of third symbol groups.

The third detection area may be a detection area that does not correspond to the second detection result in the initial detection result. The third detection area may be determined based on a Euclidean distance between the received signal and the initial detection result and a Euclidean distance between the received signal and the first detection result. When a channel gain of at least one carrier of the plurality of carriers is smaller than an average value of signal-to-interference ratios (SIRs) required for detecting the symbol group having the maximum likelihood, the third detection area may correspond to the at least one carrier.

According to various embodiments described above, the first detection area may correspond to at least one carrier of the plurality of carriers. The at least one carrier may be determined based on a size of a channel gain of an antenna included in the transmission device. The at least one carrier may be determined according to an SIR value of the received signal, and the SIR value may be measured based on at least one of a channel state between the transmission device and the reception device and filter characteristics. The first detection area may be determined based on at least one of a degree of delay spread of the signal and a modulation order of the signal.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a reception device for detecting signals, the method comprising: obtaining an initial detection result of the signals received through a plurality of carriers from a transmission device; identifying at least one carrier among the plurality of the carriers according to a channel quality for each of the plurality of carriers, the channel quality measured by each of the signals; obtaining a plurality of first symbol groups for the signals by using available symbols associated with a first detection area corresponding to the identified at least one carrier and the initial detection result; obtaining a first detection result of the signals based on a first symbol group for the signals identified among the plurality of first symbol groups according to a maximum likelihood (ML); and obtaining a second detection result of the signals by performing a ML detection for a second detection area in the obtained first detection result, the second detection area corresponding to at least another carrier of the plurality of carriers.

2. The method of claim 1, wherein obtaining the second detection result comprises:
obtaining a plurality of second symbol groups by using available symbols associated with the second detection area of the obtained first detection result; and
obtaining the second detection result of the signals based on a second symbol group for the signals identified among the plurality of second symbol groups according to a ML.

3. The method of claim 1, further comprising:
obtaining a third detection result of the signals by performing a ML detection for a third detection area in the obtained second detection result, the third detection area comprising at least one candidate carrier of the plurality of carriers, and
wherein a channel quality of the at least one candidate carrier is smaller than reference channel quality for detecting a symbol group according to a ML.

4. The method of claim 1, wherein the channel quality for each of the plurality of carriers is determined by using channel gains of antennas of the transmission device for each of the plurality of carriers.

5. The method of claim 1, wherein the channel quality is measured based on a channel state between the transmission device and the reception device.

6. The method of claim 1, wherein a number of the at least one carrier is determined based on a degree of delay spread for each of the signals.

7. The method of claim 1, wherein a first channel quality value for the identified at least one carrier is greater than a second channel quality value for the at least one another carrier.

8. The method of claim 1, wherein each of the signals is transmitted through the each of the plurality of carriers, respectively.

9. The method of claim 1, further comprising:
obtaining a third detection result of the signals by performing a ML detection for a third detection area in the obtained second detection result,
wherein the third detection area is determined based on a difference between the second detection result and the initial detection result.

10. The method of claim 9, wherein obtaining the third detection result comprises:
obtaining a plurality of third symbol groups by using available symbols associated with the third detection area of the obtained second detection result; and
obtaining the third detection result of the signals based on a third symbol group for the signals identified among the plurality of third symbol groups according to a ML.

11. An apparatus of a reception device for detecting signals, the apparatus comprising:

at least one transceiver; and at least one processor operatively coupled to the at least one transceiver, wherein the at least one transceiver is configured to:

obtain an initial detection result of the signals received through a plurality of carriers from a transmission device;

identify at least one carrier among the plurality of carriers according to a channel quality for each of the plurality of carriers, the channel quality measured by each of the signals;

obtain a plurality of first symbol groups for the signals by using available symbols associated with a first detection area corresponding to the identified at least one carrier and the initial detection result;

obtain a first detection result of the signals based on a first symbol group for the signals identified among the plurality of first symbol groups according to a maximum likelihood (ML); and obtain a second detection result of the signals by performing a ML detection for a second detection area in the obtained first detection result, the second detection area corresponding to at least another carrier of the plurality of carriers.

12. The apparatus of claim 11, wherein the at least one processor is, in order to obtain the second detection result, configured to:

obtain a plurality of second symbol groups by using available symbols associated with the second detection area of the obtained first detection result; and obtain a second detection result of the signals based on a second symbol group for the signals identified among the plurality of second symbol groups according to a ML.

13. The apparatus of claim 11, wherein the at least one processor is further configured to:

obtain a third detection result of the signals by performing a ML detection for a third detection area in the obtained second detection result, the third detection area comprising at least one candidate carrier of the plurality of carriers, and wherein a channel quality of the at least one candidate carrier of the plurality of carriers is smaller than a reference channel quality for detecting a symbol group according to a ML.

14. The apparatus of claim 11, wherein the channel quality for each of the plurality of carriers is determined by using channel gains of antennas of the transmission device for each of the plurality of carriers.

15. The apparatus of claim 11, wherein the channel quality is measured based on a channel state between the transmission device and the reception device.

16. The apparatus of claim 11, wherein a number of the at least one carrier is determined based on a degree of delay spread for each of the signals.

17. The apparatus of claim 11, wherein a first channel quality value for the identified at least one carrier is greater than a second channel quality value for the at least one another carrier.

18. The apparatus of claim 11, wherein each of the signals is transmitted through the each of the plurality of carriers, respectively.

19. The apparatus of claim 11, wherein the at least one processor is further configured to:

obtain a third detection result of the signals by performing a ML detection for a third detection area in the obtained second detection result, and wherein the third detection area is determined based on a difference between the second detection result and the initial detection result.

20. The apparatus of claim 19, wherein the at least one processor is, in order to obtain the third detection result, configured to:

obtain a plurality of third symbol groups by using available symbols associated with the third detection area of the obtained second detection result; and obtain the third detection result of the signals based on a third symbol group for the signals identified among the plurality of third symbol groups according to a ML.

* * * * *

UNITED STATES PATENT AND TRADEMARK OFFICE
CERTIFICATE OF CORRECTION

PATENT NO. : 10,051,631 B2
APPLICATION NO. : 15/354945
DATED : August 14, 2018
INVENTOR(S) : Kyeongyeon Kim, Dongkyu Sim and Chungyong Lee It is certified that error appears in the above-identified patent and that said Letters Patent is hereby corrected as shown below:

On the Title Page

(73) Assignee should read:
Samsung Electronics Co., Ltd., Suwon-si (KR);
Industry-Academic Cooperation Foundation, Yonsei University, Seoul (KR)

Signed and Sealed this
Twenty-third Day of October, 2018

Andrei Iancu
*Director of the United States Patent and Trademark Office*